US009417435B2

(12) United States Patent
Hsu et al.

(10) Patent No.: US 9,417,435 B2
(45) Date of Patent: Aug. 16, 2016

(54) OPTICAL IMAGE CAPTURING LENS ASSEMBLY

(71) Applicant: LARGAN PRECISION CO., LTD., Taichung (TW)

(72) Inventors: Po-Lun Hsu, Taichung (TW); Chun-Shan Chen, Taichung (TW); Dung-Yi Hsieh, Taichung (TW); Tsung-Han Tsai, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/918,546

(22) Filed: Oct. 20, 2015

(65) Prior Publication Data

US 2016/0041372 A1 Feb. 11, 2016

Related U.S. Application Data

(63) Continuation of application No. 13/752,405, filed on Jan. 29, 2013, now Pat. No. 9,201,215.

(30) Foreign Application Priority Data

Jan. 15, 2013 (TW) .............................. 102101505 A

(51) Int. Cl.
*G02B 13/18* (2006.01)
*G02B 13/00* (2006.01)
(Continued)

(52) U.S. Cl.
CPC .............. *G02B 13/0045* (2013.01); *G02B 9/60* (2013.01); *G02B 27/0025* (2013.01)

(58) Field of Classification Search
CPC ............ G02B 9/00; G02B 9/60; G02B 13/00; G02B 13/0015; G02B 13/0045; G02B 13/04
USPC ......... 359/642, 643, 656, 659, 663, 664, 708, 359/710, 714, 746, 745, 749, 753, 763, 764, 359/767
See application file for complete search history.

(56) References Cited

U.S. PATENT DOCUMENTS 4,993,817 A 2/1991 Hoogland
7,911,711 B1 3/2011 Tang et al.
(Continued)

FOREIGN PATENT DOCUMENTS

CN 102645732 A 8/2012
CN 102650727 A 8/2012
(Continued)

*Primary Examiner* — Ricky Mack
*Assistant Examiner* — Robert E Tallman
(74) *Attorney, Agent, or Firm* — CKC & Partners Co., Ltd.

(57) ABSTRACT

An optical image capturing lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element has negative refractive power. The fourth lens element with negative refractive power has a concave object-side surface and a convex image-side surface. The fifth lens element with refractive power has a concave image-side surface, wherein the fifth lens element has at least one inflection point formed on at least one surface thereof. Both of the object-side surface and the image-side surface of the fourth and fifth lens elements are aspheric. The optical image capturing lens assembly has a total of five lens elements with refractive power.

30 Claims, 19 Drawing Sheets

(51) Int. Cl.
*G02B 9/60* (2006.01)
*G02B 27/00* (2006.01)

(56) References Cited

U.S. PATENT DOCUMENTS

| | | | |
|---|---|---|---|
| 8,179,470 | B2 | 5/2012 | Chen et al. |
| 8,358,474 | B2 | 1/2013 | Kwon |
| 8,400,716 | B2 | 3/2013 | Jeong |
| 8,576,498 | B2 | 11/2013 | Huang |
| 8,705,182 | B1 | 4/2014 | Chen et al. |
| 8,736,984 | B1 | 5/2014 | Hsieh et al. |
| 2011/0149415 | A1 | 6/2011 | Jeong |
| 2011/0181963 | A1 | 7/2011 | Kwon |
| 2012/0092778 | A1 | 4/2012 | Tsai et al. |
| 2012/0154929 | A1 | 6/2012 | Tsai et al. |
| 2013/0003195 | A1* | 1/2013 | Kubota ............. G02B 9/60 359/764 |
| 2014/0327974 | A1 | 11/2014 | Kwon |
| 2014/0376109 | A1 | 12/2014 | Jeong |

FOREIGN PATENT DOCUMENTS

| | | |
|---|---|---|
| EP | 2317360 A1 | 5/2011 |
| JP | 2000180719 A | 6/2000 |
| JP | 2011085733 A | 4/2011 |
| JP | 2012078643 A | 4/2012 |
| WO | 2005008310 A1 | 1/2005 |
| WO | 2012169839 A2 | 12/2012 |

\* cited by examiner

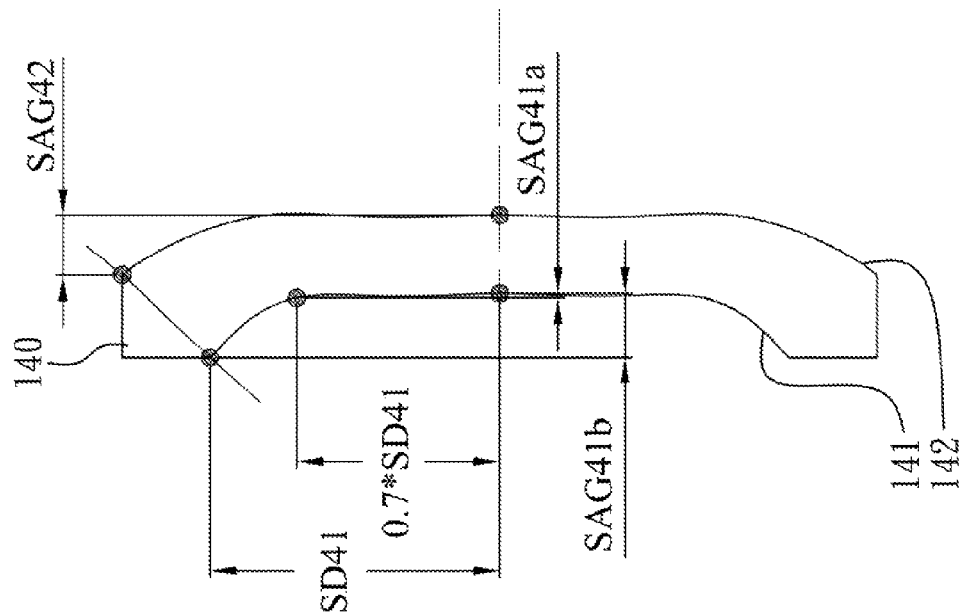

OPTICAL IMAGE CAPTURING LENS ASSEMBLY

RELATED APPLICATIONS

The present application is a continuation of the application Ser. No. 13/752,405, filed Jan. 29, 2013, which claims priority to Taiwan Application Serial Number 102101505, filed Jan. 15, 2013, which is herein incorporated by reference.

BACKGROUND

1. Technical Field

The present disclosure relates to an optical image capturing lens assembly. More particularly, the present disclosure relates to a compact optical image capturing lens assembly applicable to electronic products.

2. Description of Related Art in recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure such as the one disclosed in the U.S. Pat. No. 8,179,470. Due to the popularity of mobile products with high-end specifications, such as smart phones and PDAs (Personal Digital Assistants), the requirements for high resolution and image quality of modern compact optical lens systems increases significantly. However, the conventional four-element lens structure cannot satisfy these requirements of the compact optical lens system.

Other conventional compact optical lens systems with five-element lens structure such as the ones disclosed in the U.S. Publication Patent No. 2012/0154929 cannot effectively correct the Petzval Sum of the optical system due to the arrangement of its refractive power, so that the image plane has no flatness. It is thereby not favorable for correcting the astigmatism and coma, and the image quality cannot be effectively improved.

SUMMARY

According to one aspect of the present disclosure, an optical image capturing lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element has negative refractive power. The fourth lens element with negative refractive power has a concave object-side surface and a convex image-side surface, wherein the object-side surface and the image-side surface of the fourth lens element are aspheric. The fifth lens element with refractive power has a concave image-side surface, wherein an object-side surface and the image-side surface of the fifth lens element are aspheric, and the fifth lens element has at least one inflection point formed on at least one of the object-side surface and the image-side surface thereof. The optical image capturing lens assembly has a total of five lens elements with refractive power. When a focal length of the optical image capturing lens assembly is f, a focal length of the third lens element is f3, an axial distance between the first lens element and the second lens element is T12, an axial distance between the second lens element and the third lens element is T23, a curvature radius of an object-side surface of the second lens element is R3, and a curvature radius of an image-side surface of the second lens element is R4, the following relationships are satisfied:

$-0.60 < f/f3 < 0;$ $0 < T12/T23 < 0.40;$ and $|R3/R4| < 0.85.$

According to another aspect of the present disclosure, an optical image capturing lens assembly includes, in order from: an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element has negative refractive power, wherein an object-side surface and an image-side surface of the fourth lens element are aspheric. The fifth lens element with refractive power has a concave image-side surface, wherein an object-side surface and the image-side surface of the fifth lens element are aspheric, and the fifth lens element has at least one inflection point formed on at least one of the object-side surface and the image-side surface thereof. The optical image capturing lens assembly has a total of five lens elements with refractive power. When a focal length of the optical image capturing lens assembly is f, a focal length of the third lens element is f3, an axial distance between the first lens element and the second lens element is T12, an axial distance between the second lens element and the third lens element is T23, an Abbe number of the second lens element is V2, an Abbe number of the third lens element is V3, and an Abbe number of the fourth lens element is V4, the following relationships are satisfied:

$-0.60 < f/f3 < 0.20;$ $0 < T12/T23 < 0.75;$ and $30 < V2 + V3 + V4 < 90.$

BRIEF DESCRIPTION OF THE DRAWINGS

The present disclosure can be more fully understood by reading the following detailed description of the embodiment, with reference made to the accompanying drawings as follows:

FIG. 19 is a schematic view of the fourth lens element of the optical image capturing lens assembly according to the 1st embodiment.

DETAILED DESCRIPTION

Figure 1:
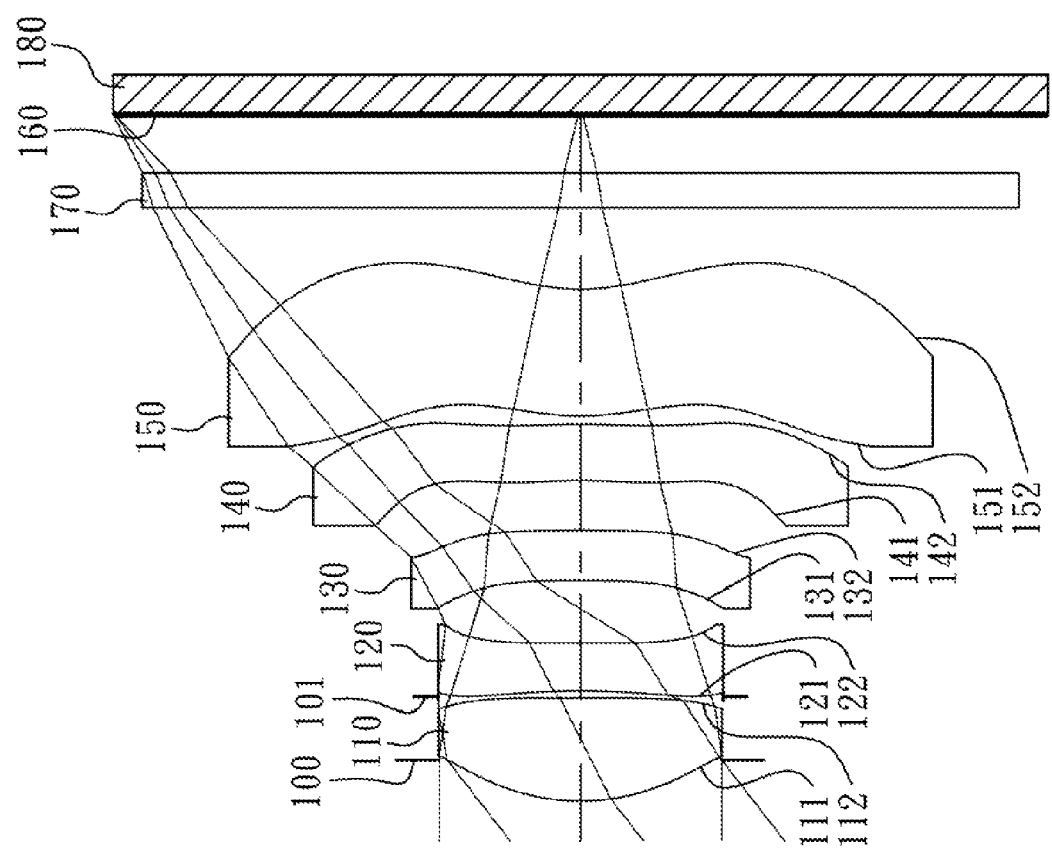
FIG. 1 is a schematic view of an optical image capturing lens assembly according to the 1st embodiment of the present disclosure.

An optical image capturing lens assembly includes, in order from an object side to an image side, a first lens element, a second lens element, a third lens element, a fourth lens element and a fifth lens element, wherein the optical image capturing lens assembly has a total of five lens elements with refractive power. The optical image capturing lens assembly further includes an image sensor located on an image plane.

The first lens element with positive refractive power has a convex object-side surface, so that the positive refractive power of the first lens element can be adjusted for reducing the total track length of the optical image capturing lens assembly.

The second lens element has negative refractive power and can have a concave object-side surface. Therefore, it is favorable for correcting the aberration generated from the first lens element.

The third lens element can have negative refractive power, a concave object-side surface and a convex image-side surface, so that the astigmatism of the optical image capturing lens assembly can be corrected.

The negative refractive power of the fourth lens element together with the negative refractive power of the second lens element is favorable for correcting the Petzval Sum of the optical image capturing lens assembly so as to form a more flat image plane. The fourth lens element has a concave object-side surface and a convex image-side surface can correct the aberration and the astigmatism of the optical image capturing lens assembly. Furthermore, the object-side surface of the fourth lens element is concave at a paraxial region and includes two inflection points between the paraxial region and a peripheral region thereof. Therefore, it is favorable for reducing the angle at which the incident light projects onto an image sensor from the off-axis so as to improve the responding efficiency of the image sensor.

The fifth lens element can have negative refractive power and a convex object-side surface, and has a concave image-side surface. Therefore, the principal point can be positioned away from the image plane, and the back focal length can be shortened so as to keep the optical image capturing lens assembly compact. Furthermore, the fifth lens element has at least one inflection point formed on at least one of the object-side surface and the image-side surface thereof so as to correct the aberration of the off-axis.

When a focal length of the optical image capturing lens assembly is f, and a focal length of the third lens element is f3, the following relationship is satisfied: $-0.60<f/f3<0.20$. It is favorable for correcting the astigmatism and coma by effectively adjusting the refractive power of the third lens element. Preferably, the following relationship is satisfied: $-0.60<f/f3<0$.

When an axial distance between the first lens element and the second lens element is T12, and an axial distance between the second lens element and the third lens element is T23, the following relationship is satisfied: $0<T12/T23<0.75$. It is favorable for manufacturing and assembling the lens elements of the optical image capturing lens assembly and keeping the assembly compact by properly adjusting the axial distances between lens elements. Preferably, the following relationship is satisfied: $0<T12/T23<0.40$. More preferably, the following relationship is further satisfied: $0<T12/T23<0.25$.

When a curvature radius of the object-side surface of the second lens element is R3, and a curvature radius of the image-side surface of the second lens element is R4, the following relationship is satisfied: $|R3/R4|<0.85$. It is favorable for correcting the aberration. Preferably, the following relationship is satisfied: $|R3/R4|<0.55$.

When the focal length of the optical image capturing lens assembly is f, the focal length of the third lens element is f3, a focal length of the fourth lens element is f4, and a focal length of the fifth lens element is f5, the following relationship is satisfied: $|f/f3|+|f/f4|+|f/f5|<0.9$. It is favorable for correcting the aberration and astigmatism and for keeping the optical image capturing lens assembly compact. Preferably, the following relationship is satisfied: $|f/f3|+|f/f4|+|f/f5|<0.5$.

When an Abbe number of the second lens element is V2, an Abbe number of the third lens element is V3, and an Abbe number of the fourth lens element is V4, the following relationship is satisfied: $30<V2+V3+V4<90$. Therefore, it is favorable for correcting the chromatic aberration. Preferably, the following relationship is satisfied: $50<V2+V3+V4<80$.

When a distance in parallel with an optical axis from an axial vertex on the object-side surface of the fourth lens element to 70% of a maximum effective diameter position on the object-side surface of the fourth lens element is SAG41a, and a distance in parallel with the optical axis from the axial vertex on the object-side surface of the fourth lens element to the maximum effective diameter position on the object-side surface of the fourth lens element is SAG41b, the following relationship is satisfied: |SAG41a/SAG41b|<0.30. Therefore, it is favorable for effectively reducing the angle at which the incident light projects onto the image sensor so as to improve the responding efficiency of the image sensor.

When a focal length of the first lens element is f1, and a focal length of the second lens element is f2, the following relationship is satisfied: −0.60<f1/f2<−0.15. Therefore, it is favorable for reducing the total track length of the optical image capturing lens assembly and for reducing the aberration.

When an axial distance between the object-side surface of the first lens element and an image plane is TL, the following relationship is satisfied: 2.0 mm<TL<4.8 mm. Therefore, it is favorable for keeping the optical image capturing lens assembly compact so as to be applied to the compact and portable electronic products.

When a distance in parallel with the optical axis from an axial vertex on the image-side surface of the fourth lens element to a maximum effective diameter position on the image-side surface of the fourth lens element is SAG42, and a central thickness of the fourth lens element is CT4, the following relationship is satisfied: −1.2<SAG42/CT4<−0.5. Therefore, it is favorable for manufacturing and shaping the lens elements of the optical image capturing lens assembly.

When a maximum image height of the optical image capturing lens assembly (half of a diagonal length of an effective photosensitive area of the image sensor) is ImgH, and the axial distance between the object-side surface of the first lens element and the image plane is TL, the following relationship is satisfied: TL/ImgH<1.60. Therefore, it is favorable for keeping the optical image capturing lens assembly compact so as to be applied to the compact and portable electronic products.

According to the optical image capturing lens assembly of the present disclosure, the lens elements thereof can be made of glass or plastic material. When the lens elements are made of glass material, the distribution of the refractive power of the optical image capturing lens assembly may be more flexible to design. When the lens elements are made of plastic material, the manufacturing cost can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. The total track length of the optical image capturing lens assembly can thereby be reduced.

According to the optical image capturing lens assembly of the present disclosure, when the lens element has a convex surface, it indicates that the surface is convex at the paraxial region; and when the lens element has a concave surface, it indicates that the surface is concave at the paraxial region.

According to the optical image capturing lens assembly of the present disclosure, there can be at least one stop provided, such as an aperture stop, a glare stop, or a field stop. Said glare stop or said field stop is allocated for reducing the stray light and thereby improving the image resolution thereof. Furthermore, an aperture stop can be configured as a front stop or a middle stop. A front stop which is disposed between the object and the first lens element can provide a longer distance from an exit pupil of the system to an image plane and thereby the generated telecentric effect improves the image-sensing efficiency of an image sensor. A middle stop which is disposed between the first lens element and the image plane is favorable for enlarging the field of view of the system and thereby provides a wider field of view for the same.

According to the optical image capturing lens assembly of the present disclosure, the optical image capturing lens assembly is featured with good correction ability and high image quality, and can be applied to 3D (three-dimensional) image capturing applications, in products such as digital cameras, mobile devices and tablets.

According to the above description of the present disclosure, the following 1st-9th specific embodiments are provided for further explanation.

1st Embodiment

Figure 2:
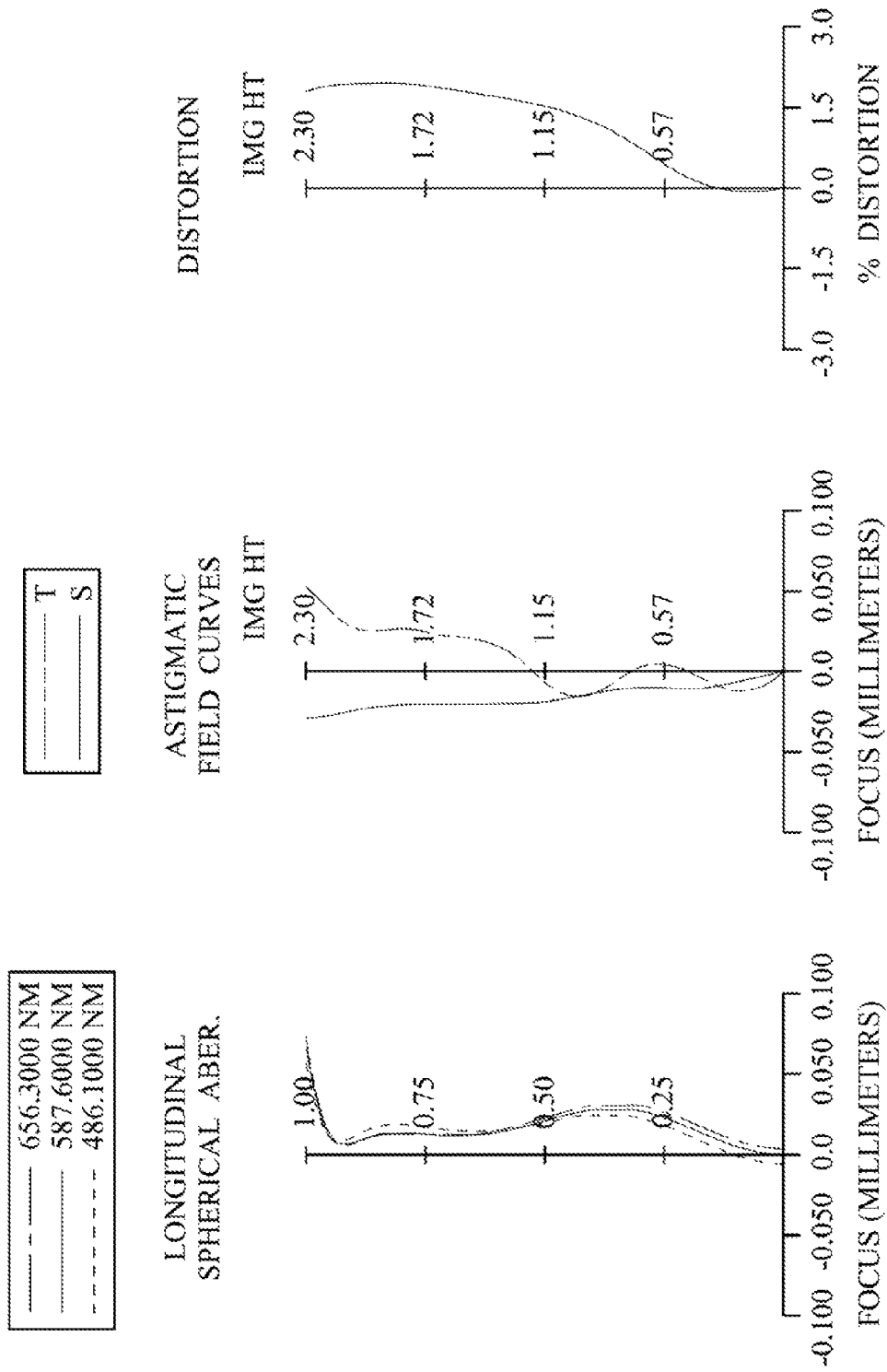
FIG. 2 shows spherical aberration curves, astigmatic field curves and a distortion curve of the optical image capturing lens assembly according to the 1st embodiment.

FIG. 1 is a schematic view of an optical image capturing lens assembly according to the 1st embodiment of the present disclosure. FIG. 2 shows spherical aberration curves, astigmatic field curves and a distortion curve of the optical image capturing lens assembly according to the 1st embodiment. In FIG. 1, the optical image capturing lens assembly includes, in order from an object side to an image side, an aperture stop 100, a first lens element 110, a stop 101, a second lens element 120, a third lens element 130, a fourth lens element 140, a fifth lens element 150, an IR-cut filter 170, an image plane 160 and an image sensor 180, wherein the optical image capturing lens assembly has a total of five lens elements (110-150) with refractive power.

The first lens element 110 with positive refractive power has a convex object-side surface 111 at a paraxial region and a concave image-side surface 112 at a paraxial region, and is made of plastic material. The object-side surface 111 and the image-side surface 112 of the first lens element 110 are aspheric.

The second lens element 120 with negative refractive power has a concave object-side surface 121 at a paraxial region and a convex image-side surface 122 at a paraxial region, and is made of plastic material. The object-side surface 121 and the image-side surface 122 of the second lens element 120 are aspheric.

The third lens element 130 with negative refractive power has a concave object-side surface 131 at a paraxial region and a convex image-side surface 132 at a paraxial region, and is made of plastic material. The object-side surface 131 and the image-side surface 132 of the third lens element 130 are aspheric.

The fourth lens element 140 with negative refractive power has a concave object-side surface 141 at a paraxial region and a convex image-side surface 142 at a paraxial region, and is made of plastic material. The object-side surface 141 and the image-side surface 142 of the fourth lens element 140 are aspheric, wherein the object-side surface 141 of the fourth lens element 140 is concave at the paraxial region and includes two inflection points between the paraxial region and a peripheral region thereof.

The fifth lens element 150 with positive refractive power has a convex object-side surface 151 at a paraxial region and a concave image-side surface 152 at a paraxial region, and is made of plastic material. The object-side surface 151 and the image-side surface 152 of the fifth lens element 150 are aspheric, wherein both of the object-side surface 151 and the image-side surface 152 have at least one inflection point.

The IR-cut filter 170 is made of glass, and located between the fifth lens element 150 and the image plane 160, and will not affect the focal length of the optical image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

Wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius:

k is the conic coefficient; and

Ai is the i-th aspheric coefficient.

In the optical image capturing lens assembly according to the 1st embodiment, when a focal length of the optical image capturing lens assembly is f, an f-number of the optical image capturing lens assembly is Fno, and half of the maximal field of view is HFOV, these parameters have the following values: f=2.89 mm; Fno=2.07; and HFOV=37.9 degrees.

In the optical image capturing lens assembly according to the 1st embodiment, when an Abbe number of the second lens element 120 is V2, an Abbe number of the third lens element 130 is V3, and an Abbe number of the fourth lens element 140 is V4, the following relationship is satisfied: V2+V3+V4=69.9.

In the optical image capturing lens assembly according to the 1st embodiment, when an axial distance between the first lens element 110 and the second lens element 120 is T12, and an axial distance between the second lens element 120 and the third lens element 130 is T23, the following relationship is satisfied: T12/T23=0.11.

In the optical image capturing lens assembly according to the 1st embodiment, when a curvature radius of the object-side surface 121 of the second lens element 120 is R3, and a curvature radius of the image-side surface 122 of the second lens element 120 is R4, the following relationship is satisfied: |R3/R4|=0.02.

In the optical image capturing lens assembly according to the 1st embodiment, when the focal length of the optical image capturing lens assembly is f, a focal length of the first lens element 110 is f1, a focal length of the second lens element 120 is f2, a focal length of the third lens element 130 is f3, a focal length of the fourth lens element 140 is f4, and a focal length of the fifth lens element 150 is f5, the following relationships are satisfied: f1/f2=−0.33; f/f3=−0.07; and |f/f3|+|f/f4|+|f/f5|=0.44.

FIG. 19 shows the fourth lens element 140 according to the FIG. 1 of the present disclosure. In FIG. 19, SAG42 is a distance in parallel with an optical axis from an axial vertex on the image-side surface 142 of the fourth lens element 140 to a maximum effective diameter position on the image-side surface 142 of the fourth lens element 140; SD41 is a vertical distance between a maximum effective diameter position on the object-side surface 141 of the fourth lens element 140 and the optical axis; 0.7*SD41 is a vertical distance between 70% of a maximum effective diameter position on the object-side surface 141 of the fourth lens element 140 and the optical axis; a distance in parallel with the optical axis from an axial vertex on the object-side surface 141 of the fourth lens element 140 to the maximum effective diameter position on the object-side surface of the fourth lens element is SAG41b, and a distance in parallel with the optical axis from the axial vertex on the object-side surface of the fourth lens element 140 to 70% of a maximum effective diameter position on the object-side surface 141 of the fourth lens element 140 is SAG41a (When the distance towards the image side of the optical image capturing lens assembly is positive, and when the distance towards the object side of the optical image capturing lens assembly is negative), the following relationships are satisfied: SAG42/CT4=−0.76; and |SAG41a/SAG41b|=0.07.

In the optical image capturing lens assembly according to the 1st embodiment, when a maximum image height of the optical image capturing lens assembly is ImgH which here is a half of the diagonal length of the effective photosensitive area of the image sensor 180, and an axial distance between the object-side surface 111 of the first lens element 110 and the image plane 160 is TL, the following relationships are satisfied: TL=3.39 mm; and TL/ImgH=1.48.

The detailed optical data of the 1st embodiment are shown in Table 1 and the aspheric surface data are shown in Table 2 below.

TABLE 1

Embodiment 1
f = 2.89 mm, Fno = 2.07, HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.202 | | | | |
| 2 | Lens 1 | 1.069 | ASP | 0.506 | Plastic | 1.544 | 55.9 | 1.97 |
| 3 | | 220.210 | ASP | 0.007 | | | | |
| 4 | Stop | Plano | | 0.028 | | | | |
| 5 | Lens 2 | −3.715 | ASP | 0.240 | Plastic | 1.640 | 23.3 | −5.92 |
| 6 | | −200.000 | ASP | 0.306 | | | | |
| 7 | Lens 3 | −7.794 | ASP | 0.250 | Plastic | 1.640 | 23.3 | −38.68 |
| 8 | | −11.520 | ASP | 0.247 | | | | |
| 9 | Lens 4 | −2.033 | ASP | 0.275 | Plastic | 1.640 | 23.3 | −8.82 |
| 10 | | −3.344 | ASP | 0.043 | | | | |
| 11 | Lens 5 | 1.219 | ASP | 0.627 | Plastic | 1.544 | 55.9 | 67.40 |
| 12 | | 1.033 | ASP | 0.400 | | | | |
| 13 | IR-cut filter | Plano | | 0.175 | Glass | 1.517 | 64.2 | — |
| 14 | | Plano | | 0.287 | | | | |
| 15 | Image | Plano | | — | | | | |

Note:
Reference wavelength (d-line) is 587.6 nm.
Half of the diameter of the stop at Surface 4 is 0.703 mm.

TABLE 2

Aspheric Coefficients

| Surface # | 2 | 3 | 5 | 6 | 7 |
|---|---|---|---|---|---|
| k = | −1.4919E−02 | −9.0000E+01 | −4.2708E+01 | −9.0000E+01 | −8.4430E+01 |
| A4 = | −7.3822E−02 | −2.6352E−02 | 6.8579E−02 | 2.2667E−01 | −3.8407E−01 |
| A6 = | 3.9046E−01 | −2.4205E+00 | −1.2405E+00 | 4.9252E−01 | 3.2548E−01 |
| A8 = | −2.1826E+00 | 1.4491E+01 | 1.0734E+00 | −1.1020E+00 | −1.0778E+01 |
| A10 = | 5.0000E+00 | −4.4177E+01 | −3.5720E+01 | 5.2223E+00 | 7.5169E+01 |
| A12 = | −6.9235E+00 | 6.5572E+01 | 5.7823E+01 | −1.2257E+01 | −2.4757E+02 |
| A14 = | 2.1750E+00 | −3.8151E+01 | −3.4974E+01 | 1.4323E+01 | 3.9993E+02 |
| A16 = | | | | | −2.5267E+02 |

| Surface # | 8 | 9 | 10 | 11 | 12 |
|---|---|---|---|---|---|
| k = | −9.0000E+01 | −8.7753E+01 | −1.8891E+01 | −1.1798E+01 | −6.6702E+00 |
| A4 = | 1.3567E−01 | 1.0394E+00 | 8.7494E−01 | −3.9148E−01 | −2.5366E−01 |
| A6 = | −2.5924E+00 | −3.0254E+00 | −1.9634E+00 | 6.2968E−02 | 1.9289E−01 |
| A8 = | 5.3950E+00 | 3.5404E+00 | 2.0875E+00 | 1.0965E−01 | −1.5327E−01 |
| A10 = | −1.5170E+00 | −1.9564E+00 | −1.3821E+00 | 4.0144E−03 | 8.6394E−02 |
| A12 = | −1.4478E+01 | −5.6545E−01 | 5.7947E−01 | −5.5931E−02 | −2.9723E−02 |
| A14 = | 2.6375E+01 | 1.2080E+00 | −1.3629E−01 | 2.4185E−02 | 5.3794E−03 |
| A16 = | −1.3783E+01 | −3.6406E−01 | 1.2733E−02 | −3.1923E−03 | −3.8056E−04 |

In Table 1, the curvature radius, the thickness and the focal length are shown in millimeters (mm). Surface numbers 0-15 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
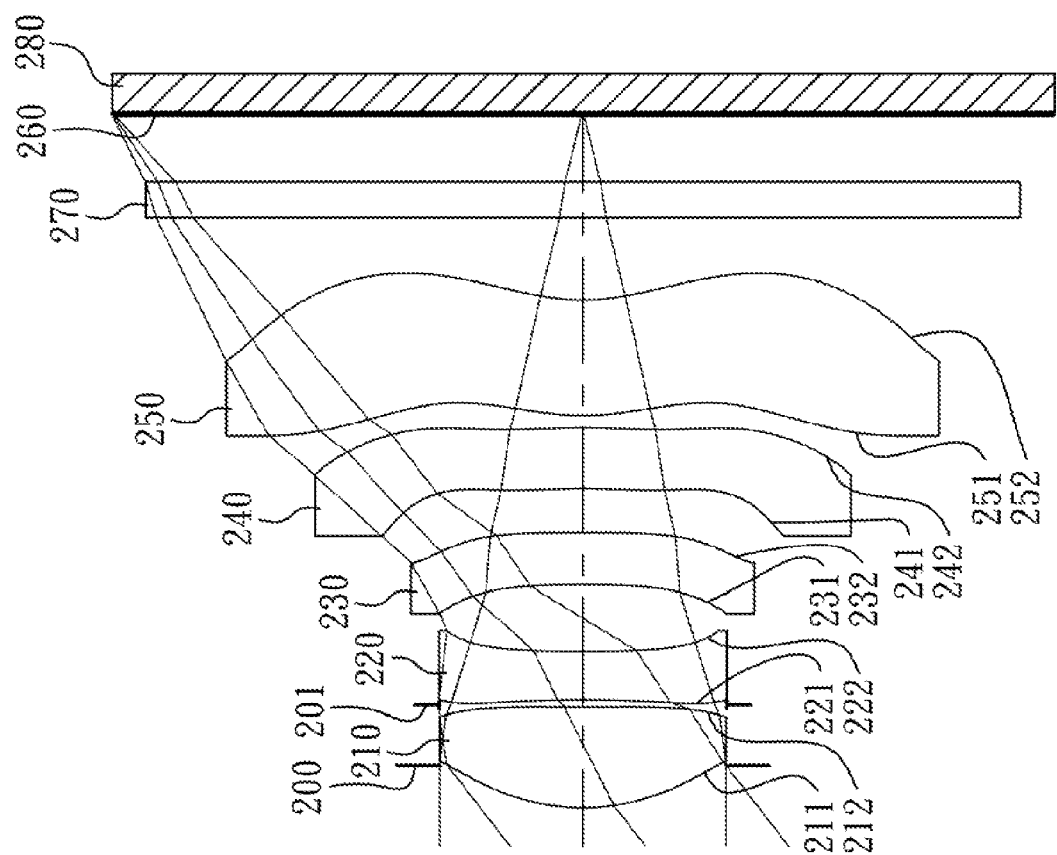
FIG. 3 is a schematic view of an optical image capturing lens assembly according to the 2nd embodiment of the present disclosure.
Figure 4:
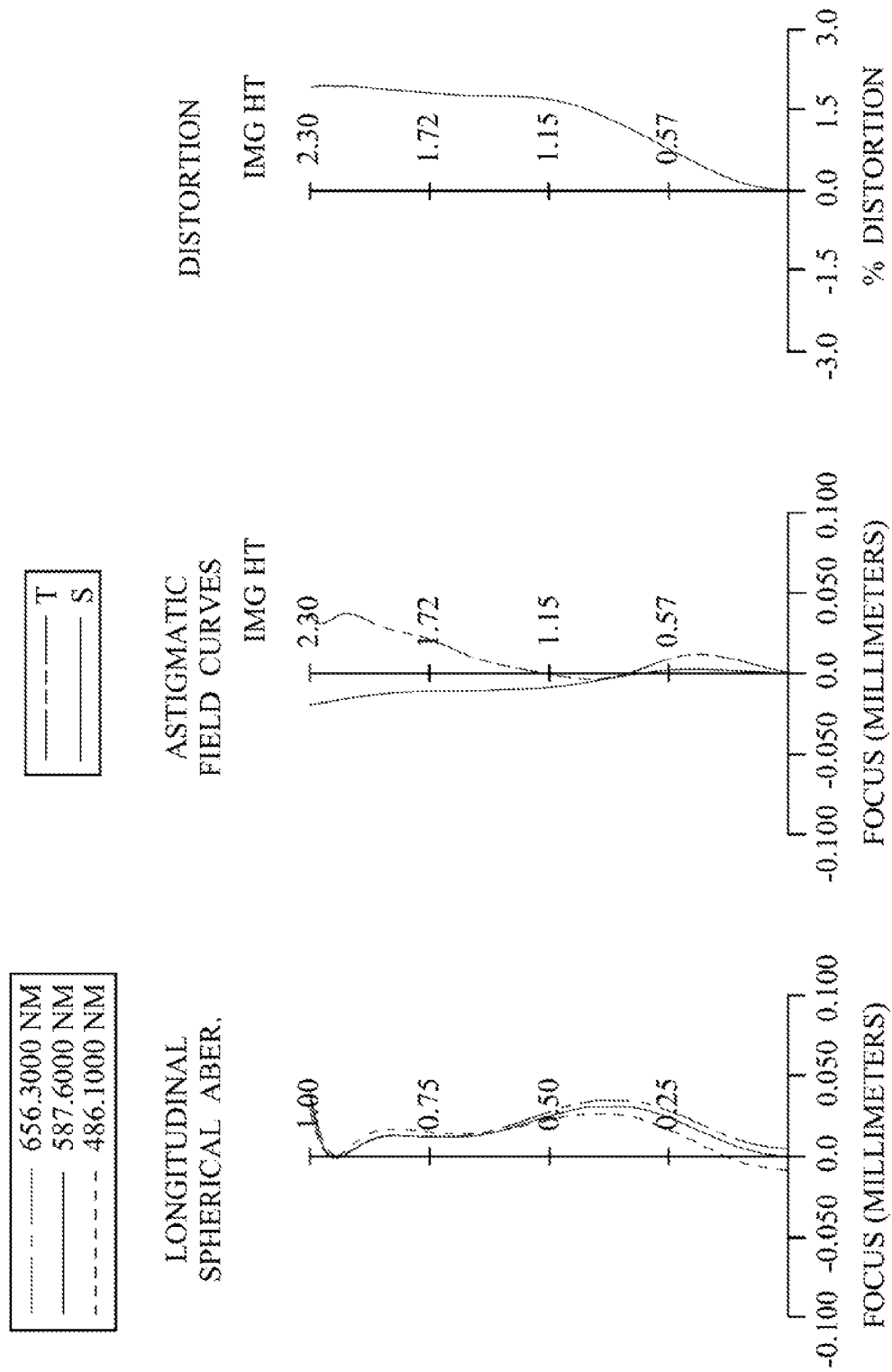
FIG. 4 shows spherical aberration curves, astigmatic field curves and a distortion curve of the optical image capturing lens assembly according to the 2nd embodiment.

FIG. 3 is a schematic view of an optical image capturing lens assembly according to the 2nd embodiment of the present disclosure. FIG. 4 shows spherical aberration curves, astigmatic field curves and a distortion curve of the optical image capturing lens assembly according to the 2nd embodiment. In FIG. 3, the optical image capturing lens assembly includes, in order from an object side to an image side, an aperture stop 200, a first lens element 210, a stop 201, a second lens element 220, a third lens element 230, a fourth lens element 240, a fifth lens element 250, an IR-cut filter 270, an image plane 260 and an image sensor 280, wherein the optical image capturing lens assembly has a total of five lens elements (210-250) with refractive power.

The first lens element 210 with positive refractive power has a convex object-side surface 211 at a paraxial region and a concave image-side surface 212 at a paraxial region, and is made of plastic material. The object-side surface 211 and the image-side surface 212 of the first lens element 210 are aspheric.

The second lens element 220 with negative refractive power has a concave object-side surface 221 at a paraxial region and a concave image-side surface 222 at a paraxial region, and is made of plastic material. The object-side surface 221 and the image-side surface 222 of the second lens element 220 are aspheric.

The third lens element 230 with negative refractive power has a concave object-side surface 231 at a paraxial region and a convex image-side surface 232 at a paraxial region, and is made of plastic material. The object-side surface 231 and the image-side surface 232 of the third lens element 230 are aspheric.

The fourth lens element 240 with negative refractive power has a concave object-side surface 241 at a paraxial region and a convex image-side surface 242 at a paraxial region, and is made of plastic material. The object-side surface 241 and the image-side surface 242 of the fourth lens element 240 are aspheric, wherein the object-side surface 241 of the fourth lens element 240 is concave at the paraxial region and includes two inflection points between the paraxial region and a peripheral region thereof.

The fifth lens element 250 with negative refractive power has a convex object-side surface 251 at a paraxial region and a concave image-side surface 252 at a paraxial region, and is made of plastic material. The object-side surface 251 and the image-side surface 252 of the fifth lens element 250 are aspheric, wherein both of the object-side surface 251 and the image-side surface 252 have at least one inflection point.

The IR-cut filter 270 is made of glass, and located between the fifth lens element 250 and the image plane 260, and will not affect the focal length of the optical image capturing lens assembly.

The detailed optical data of the 2nd embodiment are shown in Table 3 and the aspheric surface data are shown in Table 4 below.

TABLE 3

Embodiment 2
f = 2.90 mm, Fno = 2.07, HFOV = 37.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.207 | | | | |
| 2 | Lens 1 | 1.062 ASP | 0.489 | Plastic | 1.544 | 55.9 | 2.04 |

TABLE 3-continued

Embodiment 2
f = 2.90 mm, Fno = 2.07, HFOV = 37.7 deg.

| Surface # | | Curvature Radius | | Thickness | Material | Index | Abbe # | Focal Length |
|---|---|---|---|---|---|---|---|---|
| 3 | | 20.919 | ASP | 0.010 | | | | |
| 4 | Stop | Plano | | 0.025 | | | | |
| 5 | Lens 2 | −6.680 | ASP | 0.240 | Plastic | 1.640 | 23.3 | −5.89 |
| 6 | | 8.778 | ASP | 0.325 | | | | |
| 7 | Lens 3 | −6.762 | ASP | 0.256 | Plastic | 1.640 | 23.3 | −47.80 |
| 8 | | −8.810 | ASP | 0.215 | | | | |
| 9 | Lens 4 | −2.321 | ASP | 0.296 | Plastic | 1.640 | 23.3 | −19.63 |
| 10 | | −2.989 | ASP | 0.062 | | | | |
| 11 | Lens 5 | 1.259 | ASP | 0.564 | Plastic | 1.544 | 55.9 | −34.40 |
| 12 | | 0.994 | ASP | 0.400 | | | | |
| 13 | IR-cut filter | Plano | | 0.175 | Glass | 1.517 | 64.2 | — |
| 14 | | Plano | | 0.336 | | | | |
| 15 | Image | Plano | | — | | | | |

Note:
Reference wavelength (d-line) is 587.6 nm.
Half of the diameter of the stop at Surface 4 is 0.702 mm.

TABLE 4

Aspheric Coefficients

| Surface # | 2 | 3 | 5 | 6 | 7 |
|---|---|---|---|---|---|
| k = | −1.0919E−03 | −8.7175E+01 | −2.5696E+01 | −1.3544E+01 | 5.4393E+01 |
| A4 = | −6.9844E−02 | −1.4435E−01 | −8.8990E−03 | 1.3002E−01 | −3.9265E−01 |
| A6 = | 3.6532E−01 | −1.8458E+00 | −1.1077E+00 | 8.5086E−01 | 5.0799E−01 |
| A8 = | −1.9085E+00 | 1.3012E+01 | 1.1603E+01 | −3.1086E+00 | −1.1997E+01 |
| A10 = | 3.8094E+00 | −4.1107E+01 | −3.9980E+01 | 1.3601E+01 | 7.9776E+01 |
| A12 = | −4.2905E+00 | 6.0136E+01 | 6.3519E+01 | −3.1302E+01 | −2.5438E+02 |
| A14 = | | −3.3857E+01 | −3.6925E+01 | 3.0861E+01 | 4.0027E+02 |
| A16 = | | | | | −2.4954E+02 |

| Surface # | 8 | 9 | 10 | 11 | 12 |
|---|---|---|---|---|---|
| k = | −9.1110E+01 | −4.2647E+01 | −1.0691E+01 | −5.3108E+00 | −6.1100E+00 |
| A4 = | 1.6419E−01 | 1.4128E+00 | 9.3394E−01 | −5.8195E−01 | −2.9132E−01 |
| A6 = | −2.5104E+00 | −5.3022E+00 | −2.1935E+00 | 4.3686E−01 | 2.4091E−01 |
| A8 = | 3.4961E+00 | 1.0612E+01 | 2.5043E+00 | −1.9471E−01 | −1.9355E−01 |
| A10 = | 5.5042E+00 | −1.6011E+01 | −1.7707E+00 | 9.5741E−02 | 1.1169E−01 |
| A12 = | −2.5078E+01 | 1.6683E+01 | 7.8594E−01 | −4.4992E−02 | −4.0747E−02 |
| A14 = | 3.2499E+01 | −1.0482E+01 | −1.9839E−01 | 1.2093E−02 | 8.1488E−03 |
| A16 = | −1.4345E+01 | 2.9415E+00 | 2.0900E−02 | −1.2796E−03 | −6.6307E−04 |

In the optical image capturing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 2.90 | f/f3 | −0.06 |
| Fno | 2.07 | |f/f3| + |f/f4| + |f/f5| | 0.29 |
| HFOV (deg.) | 37.7 | SAG42/CT4 | −0.78 |
| V2 + V3 + V4 | 69.9 | |SAG41a/SAG41b| | 0.08 |
| T12/T23 | 0.11 | TL (mm) | 3.39 |
| |R3/R4| | 0.76 | TL/ImgH | 1.48 |
| f1/f2 | −0.35 | | |

3rd Embodiment

Figure 5:
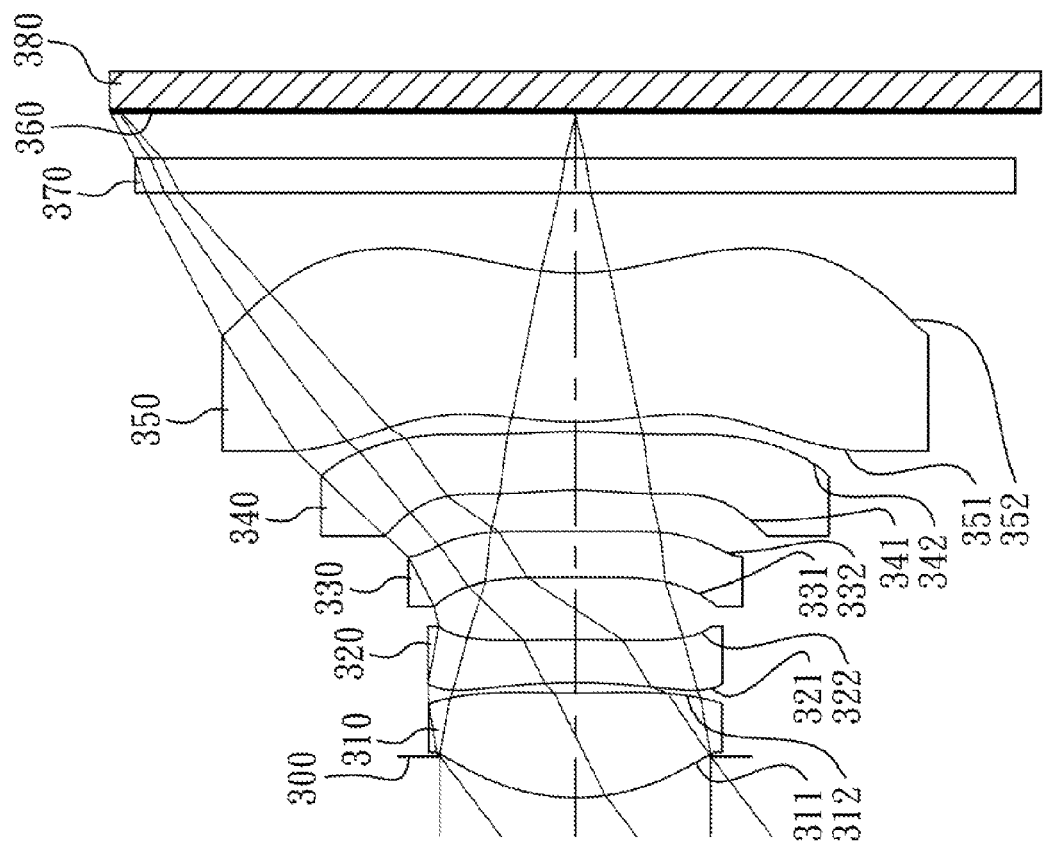
FIG. 5 is a schematic view of an optical image capturing lens assembly according to the 3rd embodiment of the present disclosure.
Figure 6:
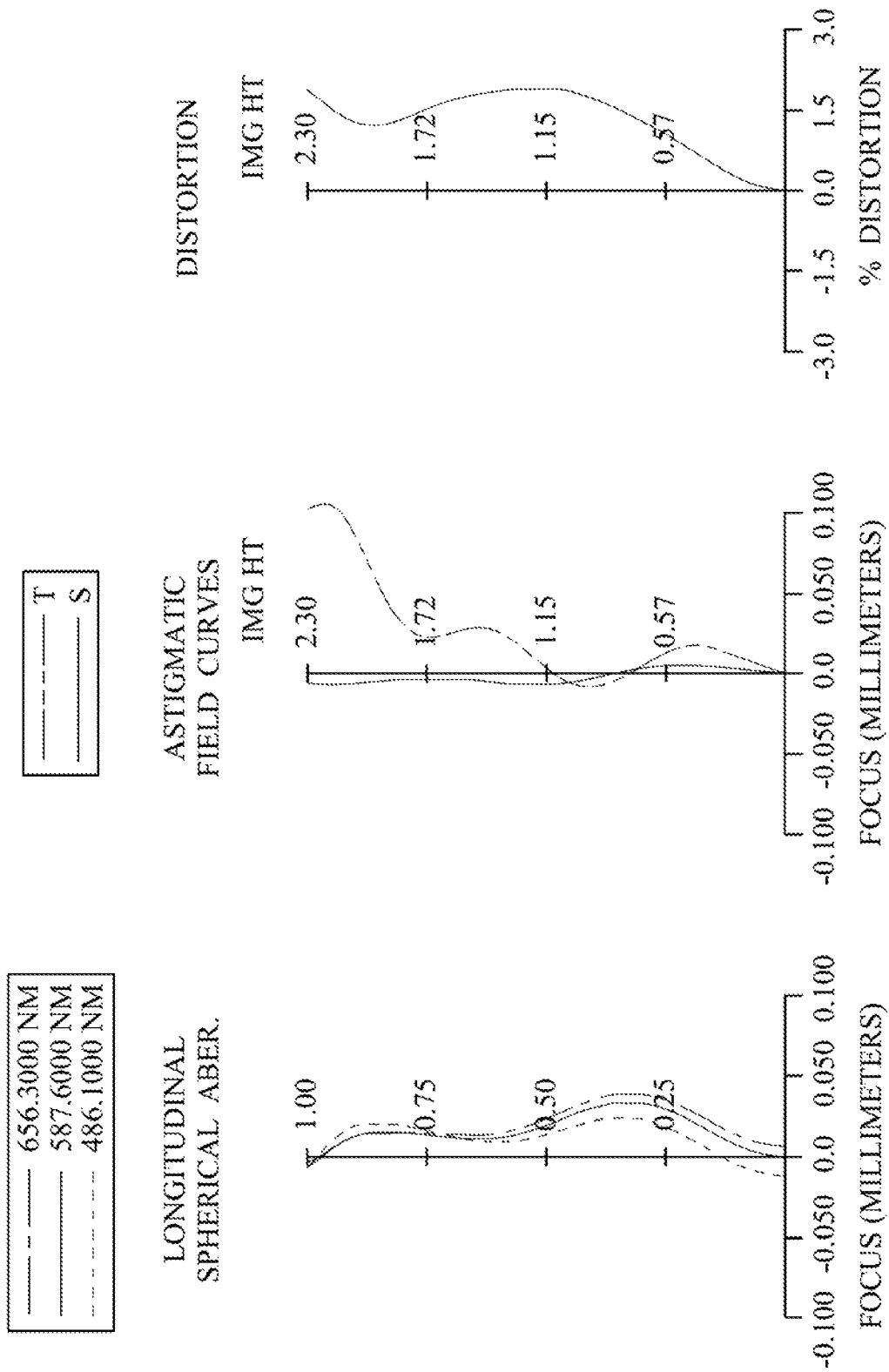
FIG. 6 shows spherical aberration curves, astigmatic field curves and a distortion curve of the optical image capturing lens assembly according to the 3rd embodiment.

FIG. 5 is a schematic view of an optical image capturing lens assembly according to the 3rd embodiment of the present disclosure. FIG. 6 shows spherical aberration curves, astigmatic field curves and a distortion curve of the optical image capturing lens assembly according to the 3rd embodiment. In FIG. 5, the optical image capturing lens assembly includes, in order from an object side to an image side, an aperture stop 300, a first lens element 310, a second lens element 320, a third lens element 330, a fourth lens element 340, a fifth lens element 350, an IR-cut filter 370, an image plane 360 and an image sensor 380, wherein the optical image capturing lens assembly has a total of five lens elements (310-350) with refractive power.

The first lens element 310 with positive refractive power has a convex object-side surface 311 at a paraxial region and a concave image-side surface 312 at a paraxial region, and is made of plastic material. The object-side surface 311 and the image-side surface 312 of the first lens element 310 are aspheric.

The second lens element 320 with negative refractive power has a concave object-side surface 321 at a paraxial region and a convex image-side surface 322 at a paraxial region, and is made of plastic material. The object-side surface 321 and the image-side surface 322 of the second lens element 320 are aspheric.

The third lens element 330 with negative refractive power has a concave object-side surface 331 at a paraxial region and a convex image-side surface 332 at a paraxial region, and is made of plastic material. The object-side surface 331 and the image-side surface 332 of the third lens element 330 are aspheric.

The fourth lens element 340 with negative refractive power has a concave object-side surface 341 at a paraxial region and a convex image-side surface 342 at a paraxial region, and is made of plastic material. The object-side surface 341 and the image-side surface 342 of the fourth lens element 340 are aspheric, wherein the object-side surface 341 of the fourth lens element 340 is concave at the paraxial region and includes two inflection points between the paraxial region and a peripheral region thereof.

The fifth lens element 350 with negative refractive power has a convex object-side surface 351 at a paraxial region and a concave image-side surface 352 at a paraxial region, and is made of plastic material. The object-side surface 351 and the image-side surface 352 of the fifth lens element 350 are aspheric, wherein both of the object-side surface 351 and the image-side surface 352 have at least one inflection point.

The IR-cut filter 370 is made of glass, and located between the fifth lens element 350 and the image plane 360, and will not affect the focal length of the optical image capturing lens assembly.

The detailed optical data of the 3rd embodiment are shown in Table 5 and the aspheric surface data are shown in Table 6 below.

TABLE 5

Embodiment 3
f = 2.92 mm, Fno = 2.15, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.207 | | | | |
| 2 | Lens 1 | 1.073 | ASP | 0.524 | Plastic | 1.544 | 55.9 | 2.13 |
| 3 | | 12.105 | ASP | 0.050 | | | | |
| 4 | Lens 2 | −3.532 | ASP | 0.220 | Plastic | 1.639 | 23.5 | −8.69 |
| 5 | | −9.947 | ASP | 0.311 | | | | |
| 6 | Lens 3 | −27.230 | ASP | 0.234 | Plastic | 1.639 | 23.5 | −126.47 |
| 7 | | −41.205 | ASP | 0.206 | | | | |
| 8 | Lens 4 | −1.752 | ASP | 0.292 | Plastic | 1.639 | 23.5 | −9.22 |
| 9 | | −2.656 | ASP | 0.048 | | | | |
| 10 | Lens 5 | 1.652 | ASP | 0.752 | Plastic | 1.535 | 55.7 | −32.43 |
| 11 | | 1.269 | ASP | 0.400 | | | | |
| 12 | IR-cut filter | Plano | | 0.175 | Glass | 1.517 | 64.2 | — |
| 13 | | Plano | | 0.238 | | | | |
| 14 | Image | Plano | | — | | | | |

Note:
Reference wavelength (d-line) is 587.6 nm.

TABLE 6

Aspheric Coefficients

| Surface # | 2 | 3 | 4 | 5 | 6 |
|---|---|---|---|---|---|
| k = | 8.8272E−02 | 7.8704E+00 | 3.9137E+00 | 8.2538E+00 | 1.0000E+01 |
| A4 = | −8.1711E−02 | −1.2896E−01 | −2.1753E−02 | 9.8605E−02 | −2.9205E−01 |
| A6 = | 5.9135E−01 | −2.1986E+00 | −5.1918E−01 | 7.5140E−01 | −6.8458E−01 |
| A8 = | −4.0572E+00 | 1.2989E+01 | 7.8898E+00 | −3.4001E−01 | −8.0504E+00 |
| A10 = | 1.2085E+01 | −3.7566E+01 | −2.8153E+01 | 9.3291E−01 | 7.5892E+01 |
| A12 = | −1.8549E+01 | 5.3869E+01 | 4.6997E+01 | −7.3588E+00 | −2.7140E+02 |
| A14 = | 9.5583E+00 | −3.0556E+01 | −2.8505E+01 | 1.3144E+01 | 4.5361E+02 |
| A16 = | | | | | −2.9424E+02 |

| Surface # | 7 | 8 | 9 | 10 | 11 |
|---|---|---|---|---|---|
| k = | 1.0000E+01 | −1.0000E+01 | 1.8259E+00 | −2.2506E+00 | −4.8588E+00 |
| A4 = | 3.0676E−01 | 1.5765E+00 | 9.0316E−01 | −6.1169E−01 | −2.9150E−01 |
| A6 = | −3.0025E+00 | −4.9597E+00 | −1.7497E+00 | 3.0758E−01 | 2.7772E−01 |
| A8 = | 3.5689E+00 | 7.3322E+00 | 1.3975E+00 | 3.8038E−02 | −2.4535E−01 |
| A10 = | 7.7655E+00 | −7.4256E+00 | −2.4313E−01 | −7.6126E−02 | 1.4744E−01 |
| A12 = | −3.2378E+01 | 4.7779E+00 | −3.6326E−01 | 1.9385E−02 | −5.4536E−02 |
| A14 = | 4.3118E+01 | −1.5686E+00 | 2.4485E−01 | 3.9800E−04 | 1.0885E−02 |
| A16 = | −1.9896E+01 | 1.8976E−01 | −4.8115E−02 | −5.2021E−04 | −8.7970E−04 |

In the optical image capturing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| f (mm) | 2.92 | f/f3 | −0.02 |
|---|---|---|---|
| Fno | 2.15 | |f/f3| + |f/f4| + |f/f5| | 0.43 |
| HFOV (deg.) | 37.5 | SAG42/CT4 | −0.75 |
| V2 + V3 + V4 | 70.5 | |SAG41a/SAG41b| | 0.16 |
| T12/T23 | 0.16 | TL (mm) | 3.45 |
| |R3/R4| | 0.36 | TL/ImgH | 1.50 |
| f1/f2 | −0.24 | | |

4th Embodiment

Figure 7:
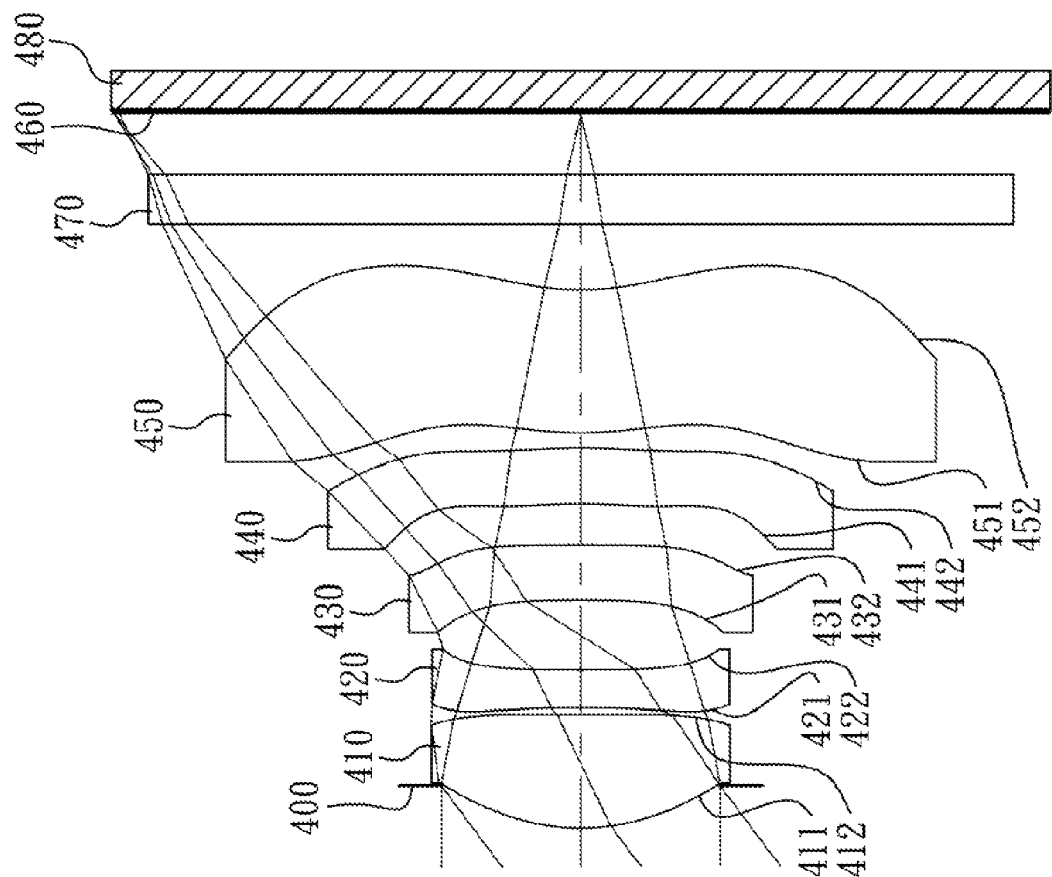
FIG. 7 is a schematic view of an optical image capturing lens assembly according to the 4th embodiment of the present disclosure.
Figure 8:
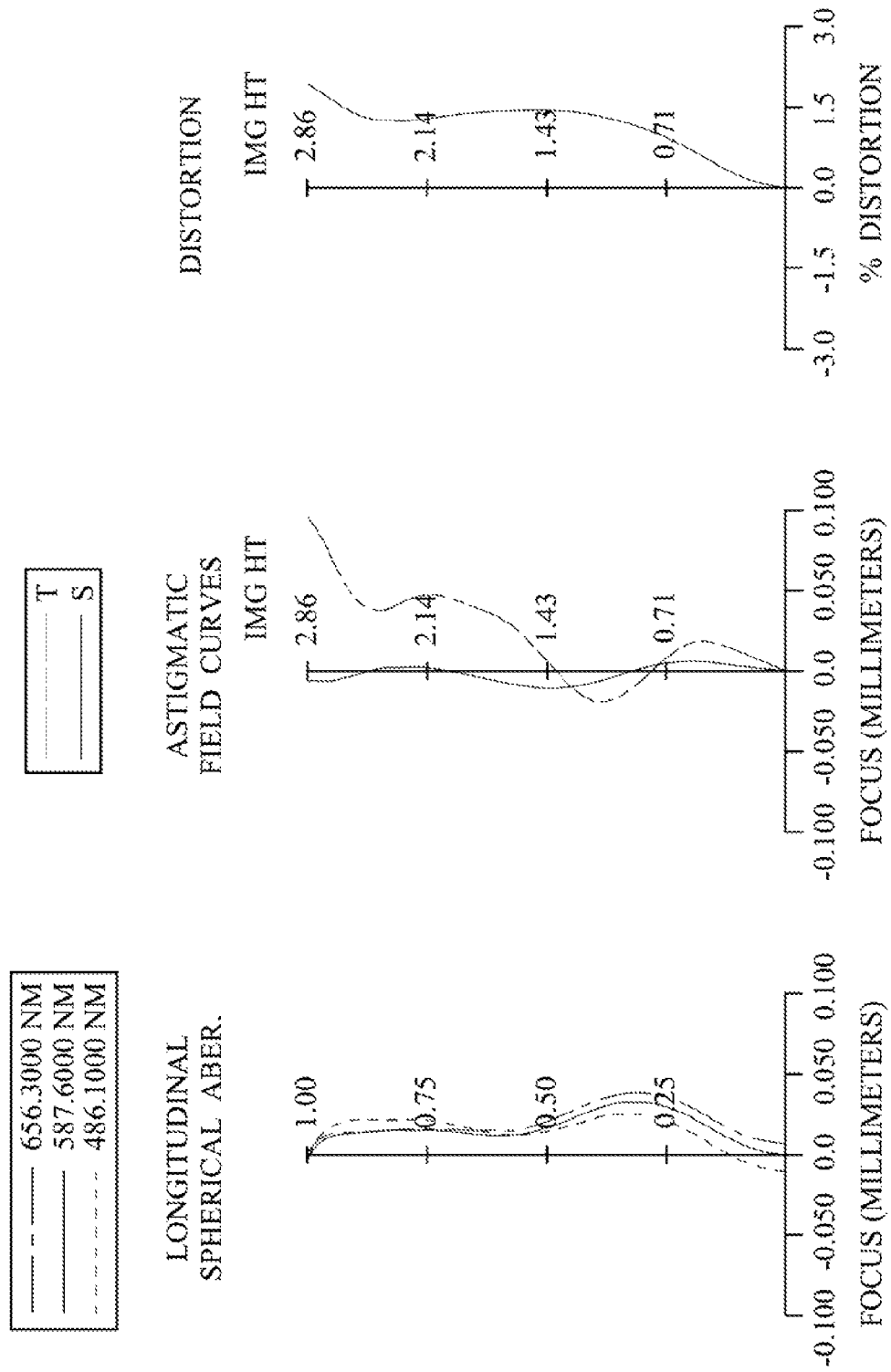
FIG. 8 shows spherical aberration curves, astigmatic field curves and a distortion curve of the optical image capturing lens assembly according to the 4th embodiment.

FIG. 7 is a schematic view of an optical image capturing lens assembly according to the 4th embodiment of the present disclosure. FIG. 8 shows spherical aberration curves, astigmatic field curves and a distortion curve of the optical image capturing lens assembly according to the 4th embodiment. In FIG. 7, the optical image capturing lens assembly includes, in order from an object side to an image side, an aperture stop 400, a first lens element 410, a second lens element 420, a third lens element 430, a fourth lens element 440, a fifth lens element 450, an IR-cut filter 470, an image plane 460 and an image sensor 480, wherein the optical image capturing lens assembly has a total of five lens elements (410-450) with refractive power.

The first lens element 410 with positive refractive power has a convex object-side surface 411 at a paraxial region and a concave image-side surface 412 at a paraxial region, and is made of plastic material. The object-side surface 411 and the image-side surface 412 of the first lens element 410 are aspheric.

The second lens element 420 with negative refractive power has a concave object-side surface 421 at a paraxial region and a concave image-side surface 422 at a paraxial region, and is made of plastic material. The object-side surface 421 and the image-side surface 422 of the second lens element 420 are aspheric.

The third lens element 430 with negative refractive power has a concave object-side surface 431 at a paraxial region and a convex image-side surface 432 at a paraxial region, and is made of plastic material. The object-side surface 431 and the image-side surface 432 of the third lens element 430 are aspheric.

The fourth lens element 440 with negative refractive power has a concave object-side surface 441 at a paraxial region and a convex image-side surface 442 at a paraxial region, and is made of plastic material. The object-side surface 441 and the image-side surface 442 of the fourth lens element 440 are aspheric, wherein the object-side surface 441 of the fourth lens element 440 is concave at the paraxial region and includes two inflection points between the paraxial region and a peripheral region thereof.

The fifth lens element 450 with negative refractive power has a convex object-side surface 451 at a paraxial region and a concave image-side surface 452 at a paraxial region, and is made of plastic material. The object-side surface 451 and the image-side surface 452 of the fifth lens element 450 are aspheric, wherein both of the object-side surface 451 and the image-side surface 452 have at least one inflection point.

The IR-cut filter 470 is made of glass, and located between the fifth lens element 450 and the image plane 460, and will not affect the focal length of the optical image capturing lens assembly.

The detailed optical data of the 4th embodiment are shown in Table 7 and the aspheric surface data are shown in Table 8 below.

TABLE 7

Embodiment 4
f = 3.74 mm, Fno = 2.20, HFOV = 36.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.257 | | | | |
| 2 | Lens 1 | 1.373 | ASP | 0.692 | Plastic | 1.565 | 57.8 | 2.57 |
| 3 | | 20.964 | ASP | 0.040 | | | | |
| 4 | Lens 2 | −6.758 | ASP | 0.230 | Plastic | 1.634 | 23.8 | −8.20 |
| 5 | | 22.883 | ASP | 0.428 | | | | |
| 6 | Lens 3 | −9.128 | ASP | 0.332 | Plastic | 1.633 | 23.4 | −23.17 |
| 7 | | −24.533 | ASP | 0.256 | | | | |
| 8 | Lens 4 | −2.693 | ASP | 0.337 | Plastic | 1.634 | 23.8 | −37.38 |
| 9 | | −3.186 | ASP | 0.092 | | | | |
| 10 | Lens 5 | 2.113 | ASP | 0.876 | Plastic | 1.535 | 55.7 | −23.95 |
| 11 | | 1.552 | ASP | 0.400 | | | | |
| 12 | IR-cut filter | Plano | | 0.300 | Glass | 1.517 | 64.2 | — |
| 13 | | Plano | | 0.392 | | | | |
| 14 | Image | Plano | | — | | | | |

Note:
Reference wavelength (d-line) is 587.6 nm.

TABLE 8

Aspheric Coefficients

| Surface # | 2 | 3 | 4 | 5 | 6 |
|---|---|---|---|---|---|
| k = | 7.7423E−02 | −4.3063E+00 | −1.4030E+01 | −1.0000E+00 | −9.8388E+00 |
| A4 = | −3.7852E−02 | −7.1956E−02 | 9.8409E−03 | 9.1470E−02 | −1.5901E−01 |
| A6 = | 1.9335E−01 | −6.5808E−01 | −2.5759E−01 | 2.0762E−01 | −2.0239E−01 |
| A8 = | −8.6105E−01 | 2.7272E+00 | 1.8726E+00 | −1.6492E−01 | −1.7362E+00 |
| A10 = | 1.6943E+00 | −5.2494E+00 | −4.1156E+00 | 2.3434E−01 | 1.0572E+01 |

TABLE 8-continued

| Aspheric Coefficients | | | | | |
|---|---|---|---|---|---|
| A12 = | −1.7235E+00 | 4.9407E+00 | 4.3475E+00 | −4.5728E−01 | −2.4693E+01 |
| A14 = | 6.2686E−01 | −1.8501E+00 | −1.7244E+00 | 5.8757E−01 | 2.6739E+01 |
| A16 = | | | | | −1.1100E+01 |

| Surface # | 7 | 8 | 9 | 10 | 11 |
|---|---|---|---|---|---|
| k = | 1.4670E+00 | −5.1866E+00 | −8.6778E−01 | −1.1114E+00 | −4.8537E+00 |
| A4 = | 1.2081E−01 | 8.2930E−01 | 4.5837E−01 | −3.2394E−01 | −1.6137E−01 |
| A6 = | −9.3433E−01 | −1.6623E+00 | −5.9122E−01 | 1.0214E−01 | 9.8057E−02 |
| A8 = | 7.7857E−01 | 1.6210E+00 | 3.0042E−01 | 8.0464E−03 | −5.4238E−02 |
| A10 = | 1.0331E+00 | −1.0600E+00 | −3.3003E−02 | −1.0688E−02 | 2.0688E−02 |
| A12 = | −2.9505E+00 | 4.2108E−01 | −3.2818E−02 | 1.8950E−03 | −4.9406E−03 |
| A14 = | 2.5520E+00 | −9.5558E−02 | 1.4473E−02 | −1.3427E−05 | 6.4478E−04 |
| A16 = | −7.5282E−01 | 1.3795E−02 | −1.8734E−03 | −1.7768E−05 | −3.4456E−05 |

In the optical image capturing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| f (mm) | 3.74 | f/f3 | −0.16 |
|---|---|---|---|
| Fno | 2.20 | |f/f3| + |f/f4| + |f/f5| | 0.42 |
| HFOV (deg.) | 36.7 | SAG42/CT4 | −0.78 |
| V2 + V3 + V4 | 71.0 | |SAG41a/SAG41b| | 0.11 |
| T12/T23 | 0.09 | TL (mm) | 4.37 |
| |R3/R4| | 0.30 | TL/ImgH | 1.53 |
| f1/f2 | −0.31 | | |

5th Embodiment

Figure 9:
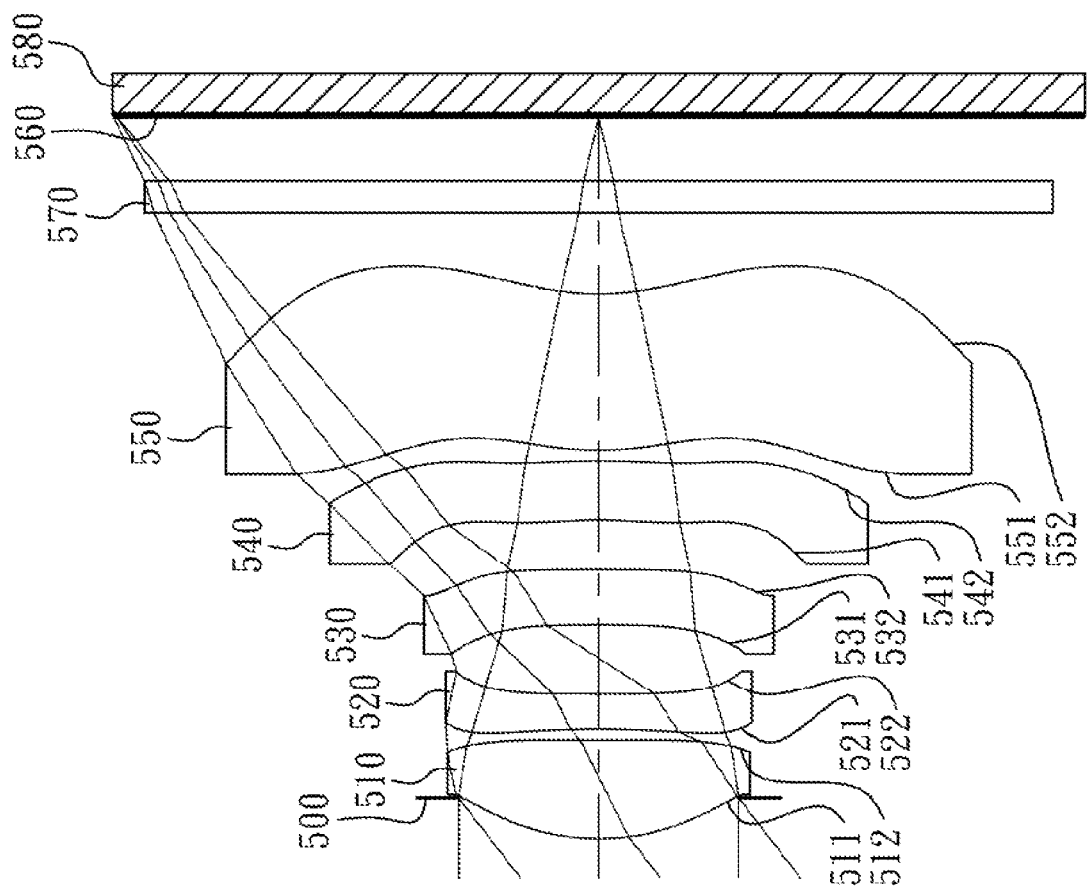
FIG. 9 is a schematic view of an optical image capturing lens assembly according to the 5th embodiment of the present disclosure.
Figure 10:
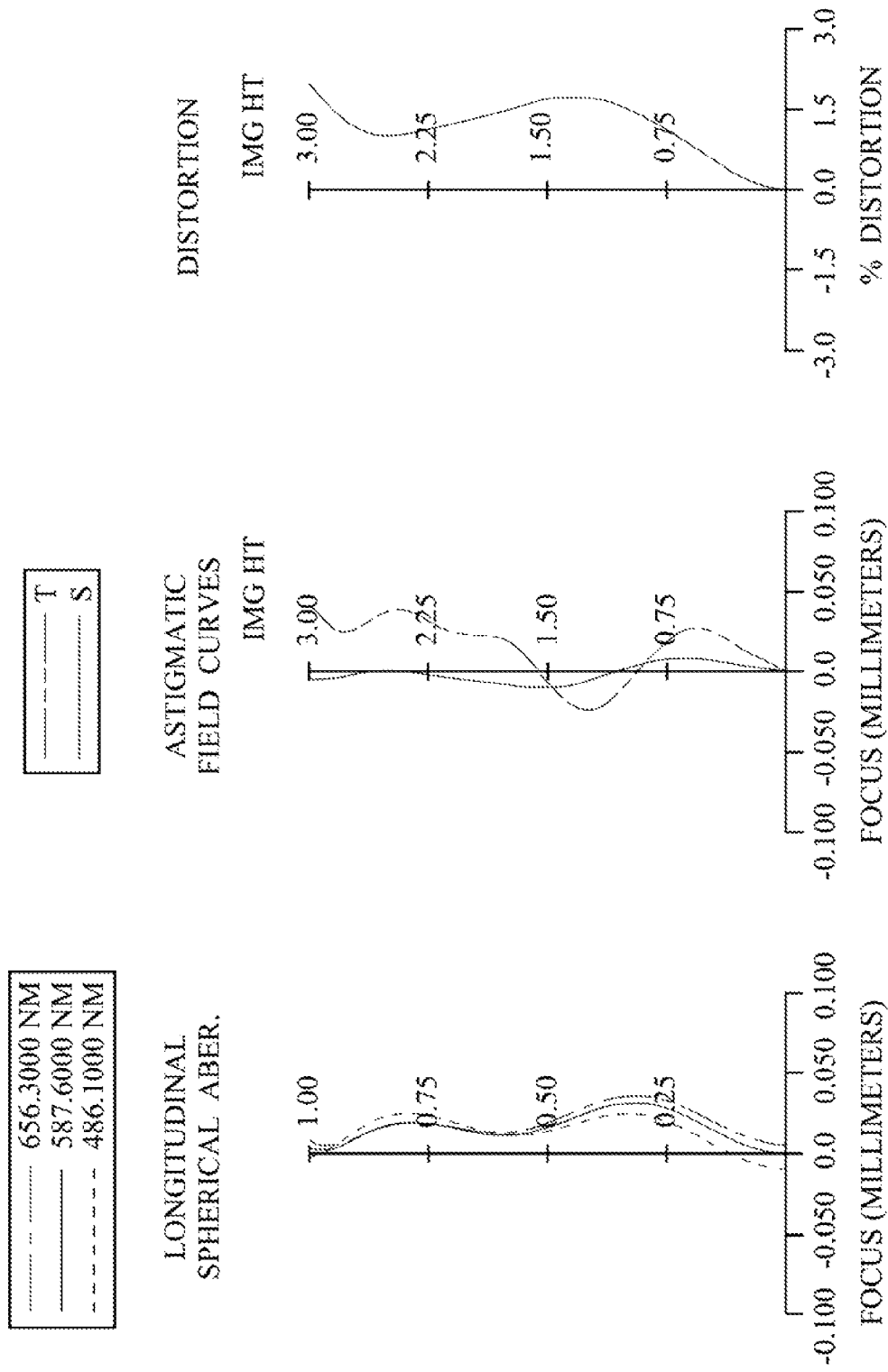
FIG. 10 shows spherical aberration curves, astigmatic field curves and a distortion curve of the optical image capturing lens assembly according to the 5th embodiment.

FIG. 9 is a schematic view of an optical image capturing lens assembly according to the 5th embodiment of the present disclosure. FIG. 10 shows spherical aberration curves, astigmatic field curves and a distortion curve of the optical image capturing lens assembly according to the 5th embodiment. In FIG. 9, the optical image capturing lens assembly includes, in order from an object side to an image side, an aperture stop 500, a first lens element 510, a second lens element 520, a third lens element 530, a fourth lens element 540, a fifth lens element 550, an IR-cut filter 570, an image plane 560 and an image sensor 580, wherein the optical image capturing lens assembly has a total of five lens elements (510-550) with refractive power.

The first lens element 510 with positive refractive power has a convex object-side surface 511 at a paraxial region and a concave image-side surface 512 at a paraxial region, and is made of plastic material. The object-side surface 511 and the image-side surface 512 of the first lens element 510 are aspheric.

The second lens element 520 with negative refractive power has a concave object-side surface 521 at a paraxial region and a concave image-side surface 522 at a paraxial region, and is made of plastic material. The object-side surface 521 and the image-side surface 522 of the second lens element 520 are aspheric.

The third lens element 530 with negative refractive power has a concave object-side surface 531 at a paraxial region and a convex image-side surface 532 at a paraxial region, and is made of plastic material. The object-side surface 531 and the image-side surface 532 of the third lens element 530 are aspheric.

The fourth lens element 540 with negative refractive power has a concave object-side surface 541 at a paraxial region and a convex image-side surface 542 at a paraxial region, and is made of plastic material. The object-side surface 541 and the image-side surface 542 of the fourth lens element 540 are aspheric, wherein the object-side surface 541 of the fourth lens element 540 is concave at the paraxial region and includes two inflection points between the paraxial region and a peripheral region thereof.

The fifth lens element 550 with positive refractive power has a convex object-side surface 551 at a paraxial region and a concave image-side surface 552 at a paraxial region, and is made of plastic material. The object-side surface 551 and the image-side surface 552 of the fifth lens element 550 are aspheric, wherein both of the object-side surface 551 and the image-side surface 552 have at least one inflection point.

The IR-cut filter 570 is made of glass, and located between the fifth lens element 550 and the image plane 560, and will not affect the focal length of the optical image capturing lens assembly.

The detailed optical data of the 5th embodiment are shown in Table 9 and the aspheric surface data are shown in Table 10 below.

TABLE 9

Ebodiment 5
f = 3.74 mm, Fno = 2.20, HFOV = 36.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.253 | | | | |
| 2 | Lens 1 | 1.407 | ASP | 0.613 | Plastic | 1.544 | 55.9 | 2.72 |
| 3 | | 24.736 | ASP | 0.066 | | | | |

TABLE 9-continued

Ebodiment 5
f = 3.74 mm, Fno = 2.20, HFOV = 36.7 deg.

| Surface # | | Curvature Radius | | Thickness | Material | Index | Abbe # | Focal Length |
|---|---|---|---|---|---|---|---|---|
| 4 | Lens 2 | −6.929 | ASP | 0.220 | Plastic | 1.640 | 23.3 | −8.16 |
| 5 | | 21.456 | ASP | 0.432 | | | | |
| 6 | Lens 3 | −13.503 | ASP | 0.342 | Plastic | 1.640 | 23.3 | −76.33 |
| 7 | | −18.847 | ASP | 0.309 | | | | |
| 8 | Lens 4 | −2.503 | ASP | 0.364 | Plastic | 1.640 | 23.3 | −12.89 |
| 9 | | −3.798 | ASP | 0.066 | | | | |
| 10 | Lens 5 | 1.776 | ASP | 0.976 | Plastic | 1.535 | 55.7 | 41.86 |
| 11 | | 1.560 | ASP | 0.500 | | | | |
| 12 | IR-cut filter | Plano | | 0.200 | Glass | 1.517 | 64.2 | — |
| 13 | | Plano | | 0.413 | | | | |
| 14 | Image | Plano | | — | | | | |

Note:
Reference wavelength (d-line) is 587.6 nm.

TABLE 10

Aspheric Coefficients

| Surface # | 2 | 3 | 4 | 5 | 6 |
|---|---|---|---|---|---|
| k = | 1.2797E−01 | 5.0000E+00 | −1.6127E+01 | −2.0000E+01 | −1.1043E+01 |
| A4 = | −3.4053E−02 | −5.6520E−02 | −2.8938E−03 | 5.5212E−02 | −1.1935E−01 |
| A6 = | 1.3504E−01 | −5.0358E−01 | −1.5186E−01 | 1.8203E−01 | −2.0729E−01 |
| A8 = | −5.9688E−01 | 1.8902E+00 | 1.2646E+00 | −1.0059E−01 | −1.2137E+00 |
| A10 = | 1.0667E+00 | −3.4164E+00 | −2.5386E+00 | 2.6140E−01 | 6.8751E+00 |
| A12 = | −1.0410E+00 | 2.9776E+00 | 2.4244E+00 | −4.8635E−01 | −1.4376E+01 |
| A14 = | 3.3971E−01 | −1.0265E+00 | −8.5126E−01 | 4.0853E−01 | 1.4105E+01 |
| A16 = | | | | | −5.3617E+00 |

| Surface # | 7 | 8 | 9 | 10 | 11 |
|---|---|---|---|---|---|
| k = | −1.6698E+01 | −1.0000E+01 | −5.3680E−01 | −2.1582E+00 | −3.7745E+00 |
| A4 = | 1.2081E−01 | 7.3942E−01 | 4.1117E−01 | −2.8294E−01 | −1.4516E−01 |
| A6 = | −7.4549E−01 | −1.3177E+00 | −4.7223E−01 | 8.0610E−02 | 7.6607E−02 |
| A8 = | 5.4111E−01 | 1.1561E+00 | 2.1510E−01 | 6.1098E−03 | −3.8129E−02 |
| A10 = | 6.9962E−01 | −6.7503E−01 | −2.1370E−02 | −6.8302E−03 | 1.3316E−02 |
| A12 = | −1.7160E+00 | 2.4421E−01 | −1.9131E−02 | 1.0422E−03 | −2.8887E−03 |
| A14 = | 1.3429E+00 | −5.1107E−02 | 7.6097E−03 | 1.3077E−05 | 3.3838E−04 |
| A16 = | −3.6483E−01 | 6.0769E−03 | −8.8292E−04 | −1.1092E−05 | −1.6064E−05 |

In the optical image capturing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 3.79 | f/f3 | −0.05 |
| Fno | 2.18 | |f/f3| + |f/f4| + |f/f5| | 0.43 |
| HFOV (deg.) | 37.7 | SAG42/CT4 | −0.72 |
| V2 + V3 + V4 | 69.9 | |SAG41a/SAG41b| | 0.10 |
| T12/T23 | 0.15 | TL (mm) | 4.50 |
| |R3/R4| | 0.32 | TL/ImgH | 1.50 |
| f1/f2 | −0.33 | | |

6th Embodiment

Figure 11:
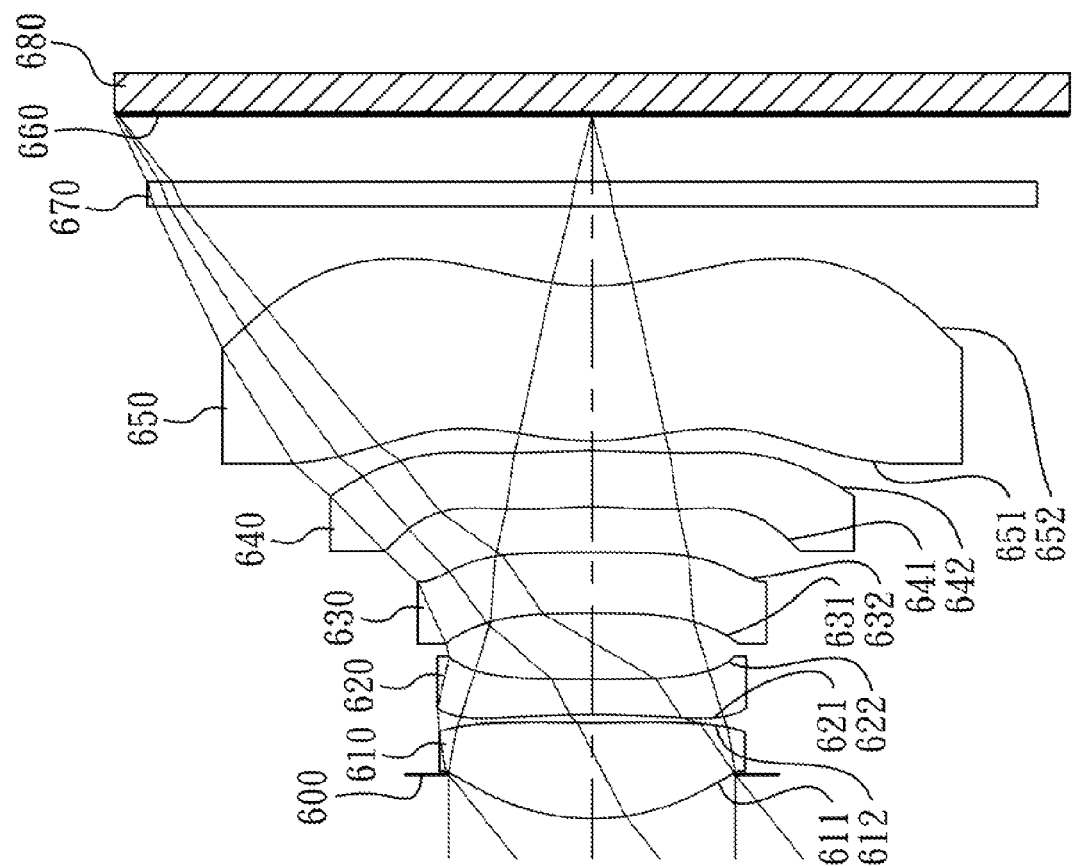
FIG. 11 is a schematic view of an optical image capturing lens assembly according to the 6th embodiment of the present disclosure.
Figure 12:
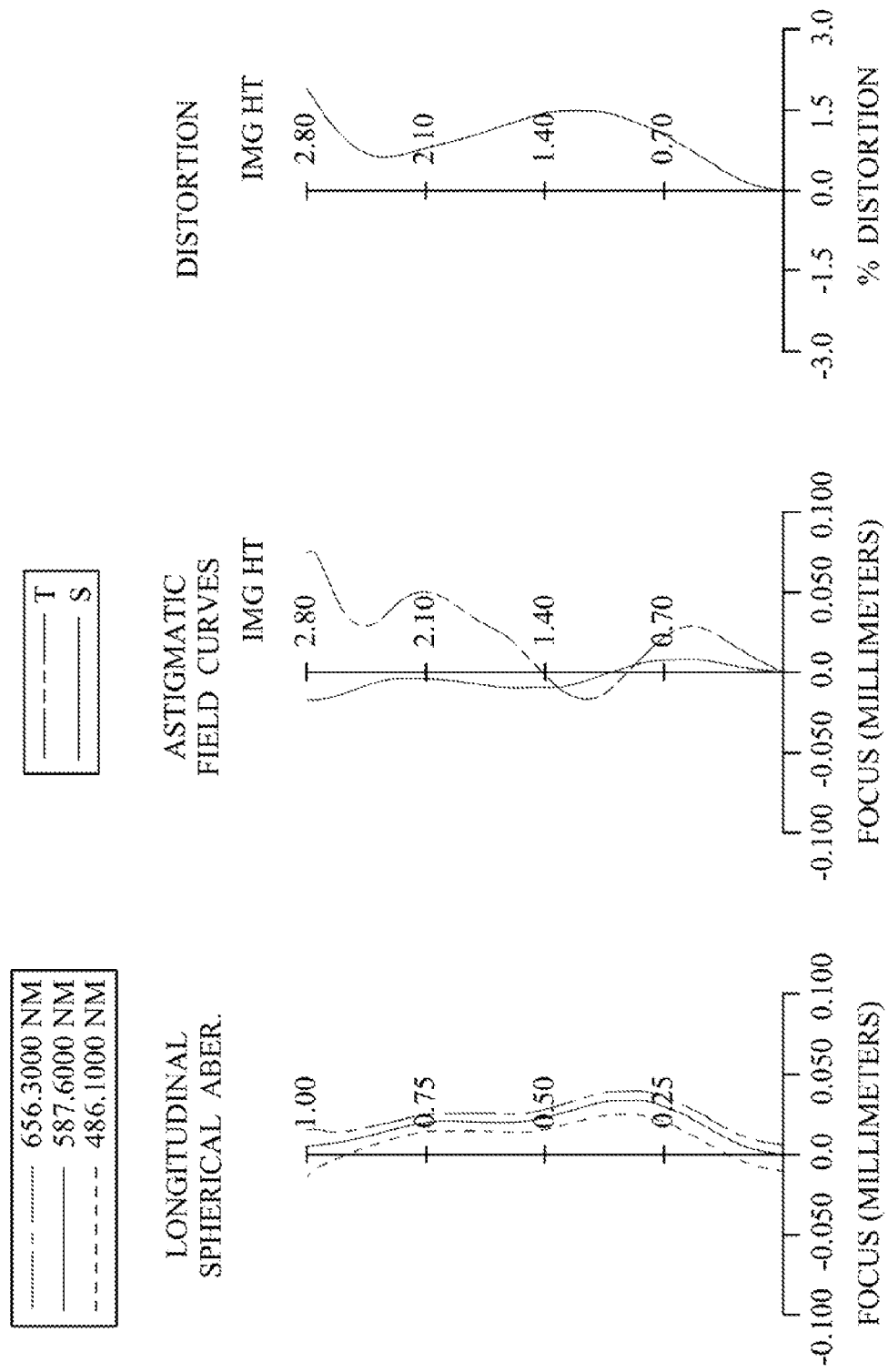
FIG. 12 shows spherical aberration curves, astigmatic field curves and a distortion curve of the optical image capturing lens assembly according to the 6th embodiment.

FIG. 11 is a schematic view of an optical image capturing lens assembly according to the 6th embodiment of the present disclosure. FIG. 12 shows spherical aberration curves, astigmatic field curves and a distortion curve of the optical image capturing lens assembly according to the 6th embodiment. In FIG. 11, the optical image capturing lens assembly includes, in order from an object side to an image side, an aperture stop 600, a first lens element 610, a second lens element 620, a third lens element 630, a fourth lens element 640, a fifth lens element 650, an IR-cut filter 670, an image plane 660 and an image sensor 680, wherein the optical image capturing lens assembly has a total of five lens elements (610-650) with refractive power.

The first lens element 610 with positive refractive power has a convex object-side surface 611 at a paraxial region and a concave image-side surface 612 at a paraxial region, and is made of plastic material. The object-side surface 611 and the image-side surface 612 of the first lens element 610 are aspheric.

The second lens element 620 with negative refractive power has a concave object-side surface 621 at a paraxial region and a concave image-side surface 622 at a paraxial region, and is made of plastic material. The object-side surface 621 and the image-side surface 622 of the second lens element 620 are aspheric.

The third lens element 630 with negative refractive power has a concave object-side surface 631 at a paraxial region and a convex image-side surface 632 at a paraxial region, and is made of plastic material. The object-side surface 631 and the image-side surface 632 of the third lens element 630 are aspheric.

The fourth lens element 640 with negative refractive power has a concave object-side surface 641 at a paraxial region and a convex image-side surface 642 at a paraxial region, and is made of plastic material. The object-side surface 641 and the image-side surface 642 of the fourth lens element 640 are aspheric, wherein the object-side surface 641 of the fourth lens element 640 is concave at the paraxial region and includes two inflection points between the paraxial region and a peripheral region thereof.

The fifth lens element 650 with positive refractive power has a convex object-side surface 651 at a paraxial region and a concave image-side surface 652 at a paraxial region, and is made of plastic material. The object-side surface 651 and the image-side surface 652 of the fifth lens element 650 are aspheric, wherein both of the object-side surface 651 and the image-side surface 652 have at least one inflection point.

The IR-cut filter 670 is made of glass, and located between the fifth lens element 650 and the image plane 660, and will not affect the focal length of the optical image capturing lens assembly.

The detailed optical data of the 6th embodiment are shown in Table 11 and the aspheric surface data are shown in Table 12 below.

TABLE 11

Embodiment 6
f = 3.40 mm, Fno = 2.01, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.259 | | | | |
| 2 | Lens 1 | 1.346 | ASP | 0.564 | Plastic | 1.565 | 57.5 | 2.55 |
| 3 | | 17.353 | ASP | 0.045 | | | | |
| 4 | Lens 2 | −7.183 | ASP | 0.210 | Plastic | 1.60 | 23.3 | −7.46 |
| 5 | | 14.366 | ASP | 0.393 | | | | |
| 6 | Lens 3 | −8.690 | ASP | 0.356 | Plastic | 1.565 | 57.5 | −68.07 |
| 7 | | −11.392 | ASP | 0.271 | | | | |
| 8 | Lens 4 | −2.557 | ASP | 0.328 | Plastic | 1.640 | 23.3 | −16.65 |
| 9 | | −3.533 | ASP | 0.059 | | | | |
| 10 | Lens 5 | 1.675 | ASP | 0.918 | Plastic | 1.565 | 57.5 | 29.67 |
| 11 | | 1.492 | ASP | 0.467 | | | | |
| 12 | IR-cut filter | Plano | | 0.145 | Glass | 1.517 | 64.2 | — |
| 13 | | Plano | | 0.402 | | | | |
| 14 | Image | Plano | | — | | | | |

Note:
Reference wavelength (d-line) is 587.6 nm.

TABLE 12

Aspheric Coefficients

| Surface # | 2 | 3 | 4 | 5 | 6 |
|---|---|---|---|---|---|
| k = | 1.8314E−01 | −6.2722E−02 | −1.9792E+01 | 3.0000E+00 | −1.4853E+01 |
| A4 = | −3.6905E−02 | −6.2284E−02 | −3.0258E−03 | 9.1349E−02 | −1.4691E−01 |
| A6 = | 2.0194E−01 | −6.4972E−01 | −2.1119E−01 | 1.8595E−01 | −2.2656E−01 |
| A8 = | −9.7098E−01 | 3.0537E+00 | 2.0368E+00 | −2.0511E−01 | −1.9880E+00 |
| A10 = | 2.0238E+00 | −6.3663E+00 | −4.8514E+00 | 6.5971E−01 | 1.2685E+01 |
| A12 = | −2.1560E+00 | 6.2276E+00 | 5.2506E+00 | −1.2284E+00 | −3.0723E+01 |
| A14 = | 7.7437E−01 | −2.3691E+00 | −2.0473E+00 | 1.0017E+00 | 3.4724E+01 |
| A16 = | | | | | −1.5092E+01 |

| Surface # | 7 | 8 | 9 | 10 | 11 |
|---|---|---|---|---|---|
| k = | −2.6157E+00 | −5.3142E+00 | 1.5868E+00 | −1.4261E+00 | −3.9026E+00 |
| A4 = | 1.4746E−01 | 9.2923E−01 | 5.0376E−01 | −3.5512E−01 | −1.7581E−01 |
| A6 = | −1.0445E+00 | −1.8638E+00 | −6.6760E−01 | 1.1174E−01 | 1.0892E−01 |
| A8 = | 8.6430E−01 | 1.8680E+00 | 3.4999E−01 | 1.0129E−02 | −6.2160E−02 |
| A10 = | 1.2899E+00 | −1.2460E+00 | −3.9510E−02 | −1.2626E−02 | 2.4814E−02 |
| A12 = | −3.6649E+00 | 5.2024E−01 | −4.0951E−02 | 2.2287E−03 | −6.1618E−03 |
| A14 = | 3.2998E+00 | −1.2923E−01 | 1.8617E−02 | 3.0940E−05 | 8.2935E−04 |
| A16 = | −1.0216E+00 | 1.8359E−02 | −2.4751E−03 | −3.1623E−05 | −4.5440E−05 |

In the optical image capturing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 3.40 | f/f3 | −0.05 |
| Fno | 2.01 | \|f/f3\| + \|f/f4\| + \|f/f5\| | 0.37 |
| HFOV (deg.) | 38.8 | SAG42/CT4 | −0.81 |
| V2 + V3 + V4 | 104.1 | \|SAG41a/SAG41b\| | 0.08 |
| T12/T23 | 0.11 | TL (mm) | 4.16 |
| \|R3/R4\| | 0.50 | TL/ImgH | 1.48 |
| f1/f2 | −0.34 | | |

7th Embodiment

Figure 13:
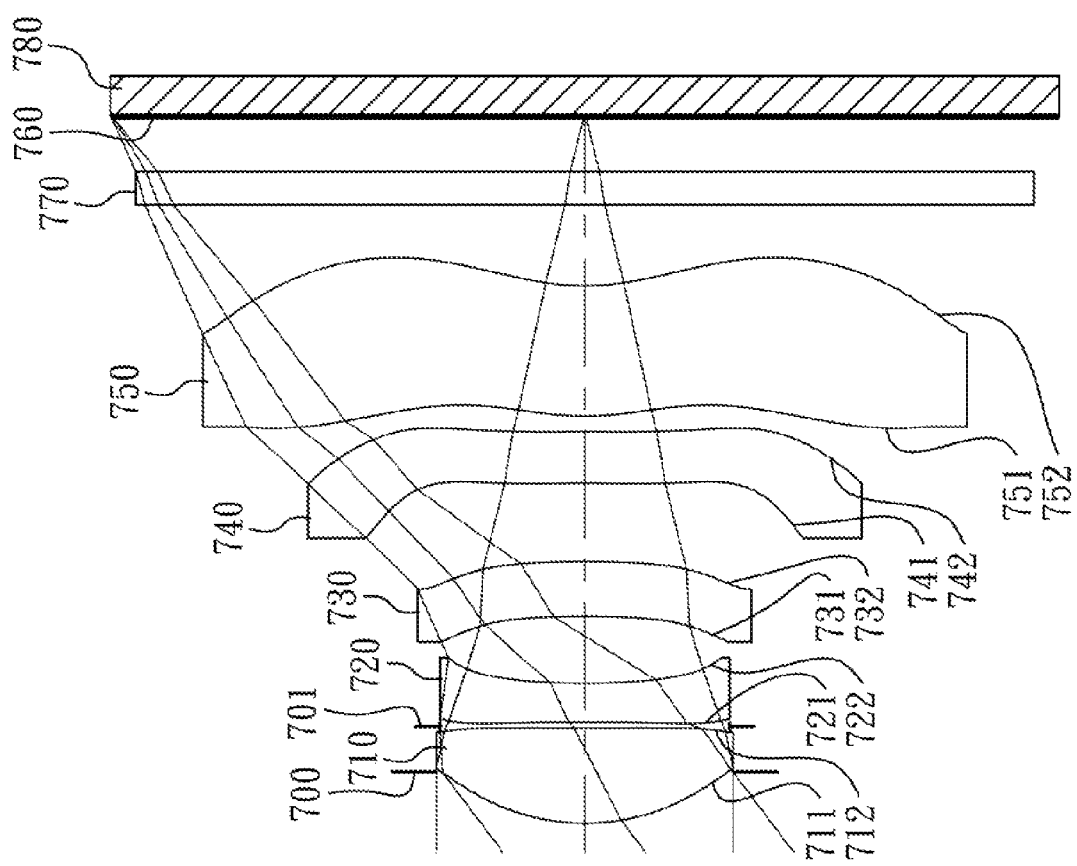
FIG. 13 is a schematic view of an optical image capturing lens assembly according to the 7th embodiment of the present disclosure.
Figure 14:
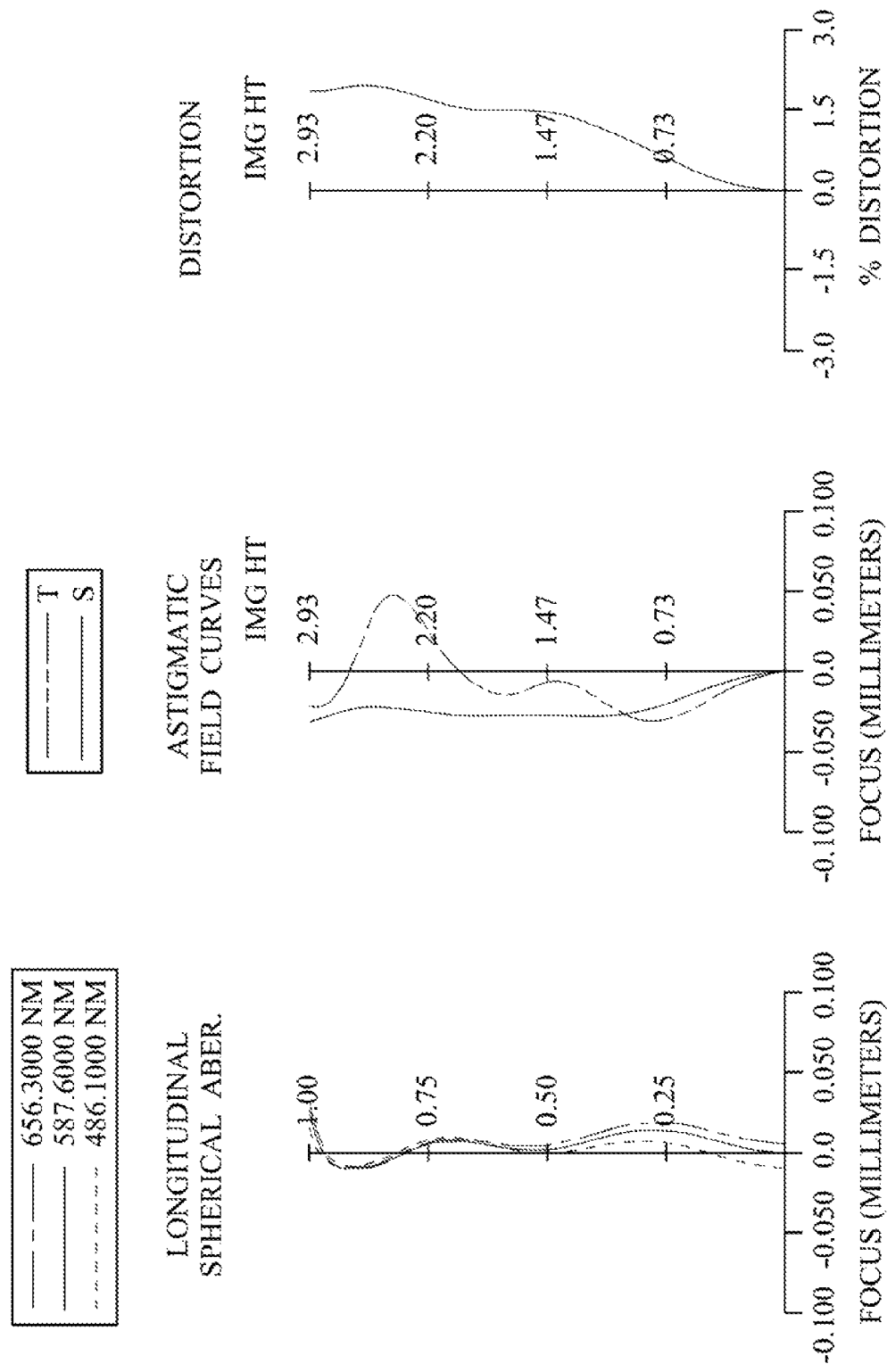
FIG. 14 shows spherical aberration curves, astigmatic field curves and a distortion curve of the optical image capturing lens assembly according to the 7th embodiment.

FIG. 13 is a schematic view of an optical image capturing lens assembly according to the 7th embodiment of the present disclosure. FIG. 14 shows spherical aberration curves, astigmatic field curves and a distortion curve of the optical image capturing lens assembly according to the 7th embodiment. In FIG. 13, the optical image capturing lens assembly includes, in order from an object side to an image side, an aperture stop 700, a first lens element 710, a stop 701, a second lens element 720, a third lens element 730, a fourth lens element 740, a fifth lens element 750, an IR-cut filter 770, an image plane 760 and an image sensor 780, wherein the optical image capturing lens assembly has a total of five lens elements (710-750) with refractive power.

The first lens element 710 with positive refractive power has a convex object-side surface 711 at a paraxial region and a concave image-side surface 712 at a paraxial region, and is made of plastic material. The object-side surface 711 and the image-side surface 712 of the first lens element 710 are aspheric.

The second lens element 720 with negative refractive power has a concave object-side surface 721 at a paraxial region and a concave image-side surface 722 at a paraxial region, and is made of plastic material. The object-side surface 721 and the image-side surface 722 of the second lens element 720 are aspheric.

The third lens element 730 with positive refractive power has a concave object-side surface 731 at a paraxial region and a convex image-side surface 732 at a paraxial region, and is made of plastic material. The object-side surface 731 and the image-side surface 732 of the third lens element 730 are aspheric.

The fourth lens element 740 with negative refractive power has a concave object-side surface 741 at a paraxial region and a convex image-side surface 742 at a paraxial region, and is made of plastic material. The object-side surface 741 and the image-side surface 742 of the fourth lens element 740 are aspheric, wherein the object-side surface 741 of the fourth lens element 740 is concave at the paraxial region and includes two inflection points between the paraxial region and a peripheral region thereof.

The fifth lens element 750 with negative refractive power has a convex object-side surface 751 at a paraxial region and a concave image-side surface 752 at a paraxial region, and is made of plastic material. The object-side surface 751 and the image-side surface 752 of the fifth lens element 750 are aspheric, wherein both of the object-side surface 751 and the image-side surface 752 have at least one inflection point.

The IR-cut filter 770 is made of glass, and located between the fifth lens element 750 and the image plane 760, and will not affect the focal length of the optical image capturing lens assembly.

The detailed optical data of the 7th embodiment are shown in Table 13 and the aspheric surface data are shown in Table 14 below.

TABLE 13

Embodiment 7
f = 3.81 mm, Fno = 2.07, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.318 | | | | |
| 2 | Lens 1 | 1.348 | ASP | 0.591 | Plastic | 1.544 | 55.9 | 2.65 |
| 3 | | 16.992 | ASP | 0.010 | | | | |
| 4 | Stop | Plano | | 0.025 | | | | |
| 5 | Lens 2 | −58.506 | ASP | 0.240 | Plastic | 1.640 | 23.3 | −6.34 |
| 6 | | 4.368 | ASP | 0.419 | | | | |
| 7 | Lens 3 | −7.691 | ASP | 0.337 | Plastic | 1.640 | 23.3 | 196.94 |
| 8 | | −7.372 | ASP | 0.491 | | | | |
| 9 | Lens 4 | −6.677 | ASP | 0.317 | Plastic | 1.640 | 23.3 | −17.11 |
| 10 | | −17.432 | ASP | 0.100 | | | | |
| 11 | Lens 5 | 1.725 | ASP | 0.808 | Plastic | 1.544 | 55.9 | −135.39 |
| 12 | | 1.407 | ASP | 0.500 | | | | |
| 13 | IR-cut filter | Plano | | 0.210 | Glass | 1.517 | 64.2 | — |
| 14 | | Plano | | 0.344 | | | | |
| 15 | Image | Plano | | — | | | | |

Note:
Reference wavelength (d-line) is 587.6 nm.
Half of the diameter of the stop at Surface 4 is 0.899 mm.

TABLE 14

Aspheric Coefficients

| Surface # | 2 | 3 | 5 | 6 | 7 |
|---|---|---|---|---|---|
| k = | 1.4580E−01 | 1.9577E+01 | 2.0000E+01 | −1.2747E+01 | −5.4251E+01 |
| A4 = | −2.6699E−02 | −9.9766E−02 | −9.1607E−02 | 4.0402E−02 | −1.2612E−01 |
| A6 = | 1.2577E−01 | −1.6081E−01 | 6.3755E−02 | 1.6819E−01 | −3.0836E−01 |
| A8 = | −4.0995E−01 | 1.1911E+00 | 8.1036E−01 | −1.1613E−01 | −7.7301E−02 |
| A10 = | 5.7007E−01 | −2.3760E+00 | −1.9435E+00 | 1.3454E−01 | 3.1938E+00 |
| A12 = | −3.5096E−01 | 1.9792E+00 | 1.8179E+00 | −1.1640E−01 | −8.8026E+00 |
| A14 = | | −6.2694E−01 | −5.6668E−01 | 2.7107E−01 | 1.0096E+01 |
| A16 = | | | | | −4.1662E+00 |

| Surface # | 8 | 9 | 10 | 11 | 12 |
|---|---|---|---|---|---|
| k = | −3.5253E+01 | −5.8791E+01 | −2.0629E+01 | −3.0940E+00 | −4.0273E+00 |
| A4 = | −8.7208E−02 | 4.3062E−01 | 2.0475E−01 | −3.7261E−01 | −1.7876E−01 |
| A6 = | −6.6871E−02 | −8.3799E−01 | −2.4607E−01 | 2.5381E−01 | 1.1120E−01 |
| A8 = | −8.4036E−01 | 8.5912E−01 | 1.3209E−01 | −1.0149E−01 | −5.4684E−02 |
| A10 = | 3.0532E+00 | −6.3309E−01 | −5.9001E−02 | 2.6093E−02 | 1.7576E−02 |
| A12 = | −4.5465E+00 | 2.6665E−01 | 2.0792E−02 | −4.1748E−03 | −3.3610E−03 |
| A14 = | 3.2829E+00 | −5.4393E−02 | −4.1529E−03 | 3.7728E−04 | 3.4246E−04 |
| A16 = | −9.0530E−01 | 4.2686E−03 | 3.2160E−04 | −1.4697E−05 | −1.4164E−05 |

In the optical image capturing lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 3.81 | f/f3 | 0.02 |
| Fno | 2.07 | $|f/f3| + |f/f4| + |f/f5|$ | 0.27 |
| HFOV (deg.) | 37.1 | SAG42/CT4 | −1.02 |
| V2 + V3 + V4 | 69.9 | $|SAG41a/SAG41b|$ | 0.03 |
| T12/T23 | 0.08 | TL (mm) | 4.39 |
| $|R3/R4|$ | 13.40 | TL/ImgH | 1.50 |
| f1/f2 | −0.42 | | |

8th Embodiment

Figure 15:
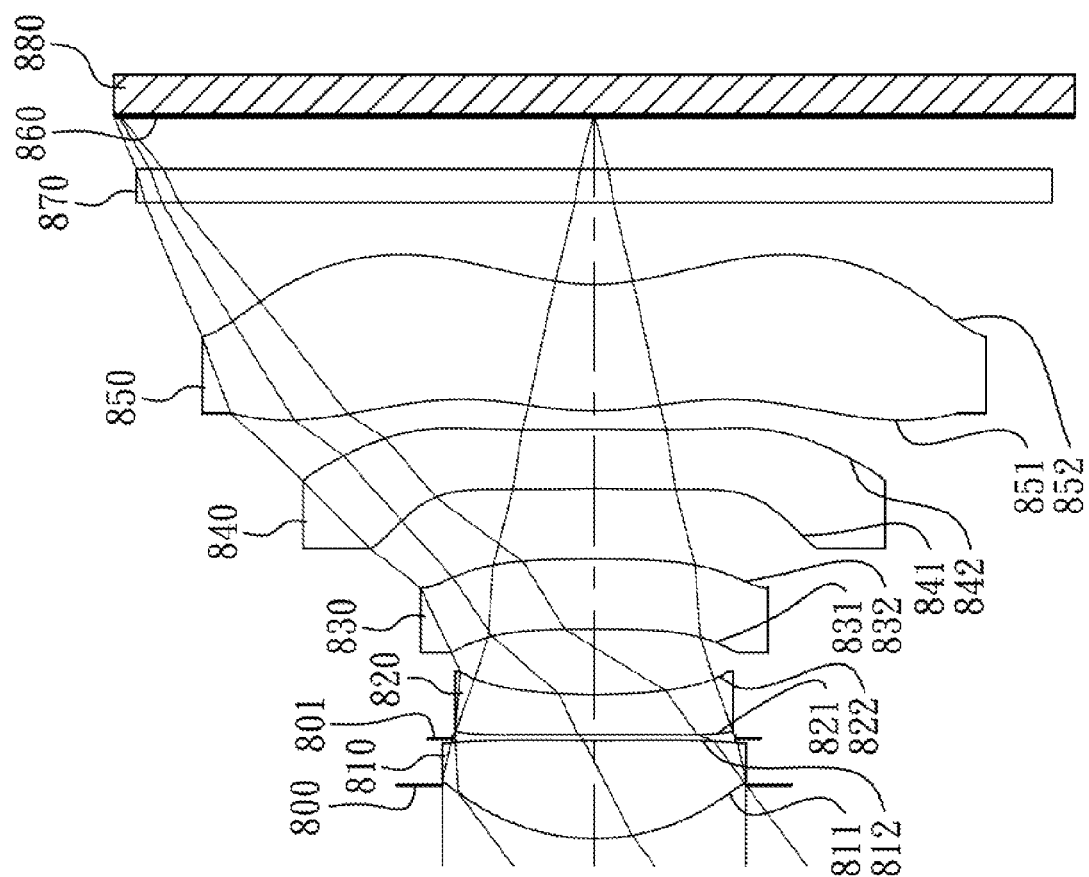
FIG. 15 is a schematic view of an optical image capturing lens assembly according to the 8th embodiment of the present disclosure.
Figure 16:
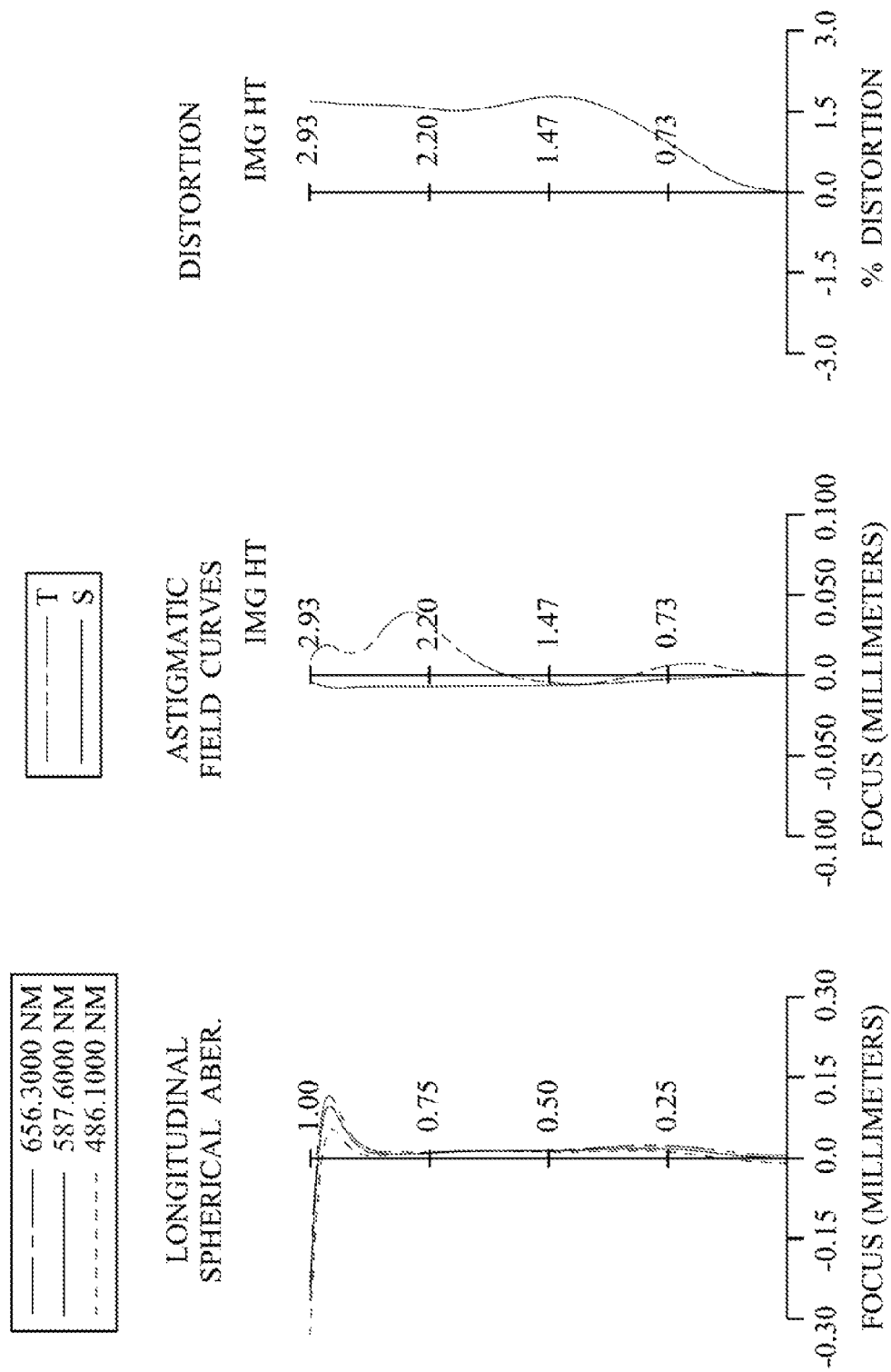
FIG. 16 shows spherical aberration curves, astigmatic field curves and a distortion curve of the optical image capturing lens assembly according to the 8th embodiment.

FIG. 15 is a schematic view of an optical image capturing lens assembly according to the 8th embodiment of the present disclosure. FIG. 16 shows spherical aberration curves, astigmatic field curves and a distortion curve of the optical image capturing lens assembly according to the 8th embodiment. In FIG. 15, the optical image capturing lens assembly includes, in order from an object side to an image side, an aperture stop 800, a first lens element 810, a stop 801, a second lens element 820, a third lens element 830, a fourth lens element 840, a fifth lens element 850, an IR-cut filter 870, an image plane 860 and an image sensor 880, wherein the optical image capturing lens assembly has a total of five lens elements (810-850) with refractive power.

The first lens element 810 with positive refractive power has a convex object-side surface 811 at a paraxial region and a concave image-side surface 812 at a paraxial region, and is made of plastic material. The object-side surface 811 and the image-side surface 812 of the first lens element 810 are aspheric.

The second lens element 820 with negative refractive power has a convex object-side surface 821 at a paraxial region and a concave image-side surface 822 at a paraxial region, and is made of plastic material. The object-side surface 821 and the image-side surface 822 of the second lens element 820 are aspheric.

The third lens element 830 with positive refractive power has a concave object-side surface 831 at a paraxial region and a convex image-side surface 832 at a paraxial region, and is made of plastic material. The object-side surface 831 and the image-side surface 832 of the third lens element 830 are aspheric.

The fourth lens element 840 with negative refractive power has a concave object-side surface 841 at a paraxial region and a convex image-side surface 842 at a paraxial region, and is made of plastic material. The object-side surface 841 and the image-side surface 842 of the fourth lens element 840 are aspheric, wherein the object-side surface 841 of the fourth lens element 840 is concave at the paraxial region and includes two inflection points between the paraxial region and a peripheral region thereof.

The fifth lens element 850 with negative refractive power has a convex object-side surface 851 at a paraxial region and a concave image-side surface 852 at a paraxial region, and is made of plastic material. The object-side surface 851 and the image-side surface 852 of the fifth lens element 850 are aspheric, wherein both of the object-side surface 851 and the image-side surface 852 have at least one inflection point.

The IR-cut filter 870 is made of glass, and located between the fifth lens element 850 and the image plane 860, and will not affect the focal length of the optical image capturing lens assembly.

The detailed optical data of the 8th embodiment are shown in Table 15 and the aspheric surface data are shown in Table 16 below.

TABLE 15

Embodiment 8
f = 3.82 mm, Fno = 1.85, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.330 | | | | |
| 2 | Lens 1 | 1.359 | ASP | 0.607 | Plastic | 1.544 | 55.9 | 2.63 |
| 3 | | 22.250 | ASP | 0.010 | | | | |
| 4 | Stop | Plano | | 0.025 | | | | |
| 5 | Lens 2 | 74.883 | ASP | 0.243 | Plastic | 1.640 | 23.3 | −5.97 |
| 6 | | 3.630 | ASP | 0.408 | | | | |
| 7 | Lens 3 | −11.911 | ASP | 0.429 | Plastic | 1.640 | 23.3 | 81.22 |
| 8 | | −9.826 | ASP | 0.438 | | | | |
| 9 | Lens 4 | −6.438 | ASP | 0.365 | Plastic | 1.640 | 23.3 | −20.87 |
| 10 | | −12.704 | ASP | 0.113 | | | | |
| 11 | Lens 5 | 1.804 | ASP | 0.782 | Plastic | 1.544 | 55.9 | −42.24 |
| 12 | | 1.417 | ASP | 0.500 | | | | |
| 13 | IR-cut filter | Plano | | 0.210 | Glass | 1.517 | 64.2 | — |
| 14 | | Plano | | 0.329 | | | | |
| 15 | Image | Plano | | — | | | | |

Note:
Reference wavelength (d-line) is 587.6 nm.
Half of the diameter of the aperture stop at Surface 1 is 0.936 mm.
Half of the diameter of the stop at Surface 4 is 0.872 mm.

TABLE 16

Aspheric Coefficients

| Surface # | 2 | 3 | 5 | 6 | 7 |
|---|---|---|---|---|---|
| k = | 4.5661E−01 | 2.0298E+01 | −1.0000E+00 | −1.3407E+01 | 3.4749E+00 |
| A4 = | −3.6015E−02 | −8.7150E−02 | −9.5319E−02 | 2.7771E−02 | −1.2649E−01 |
| A6 = | 8.4021E−02 | −1.0465E−01 | 6.6412E−02 | 1.8929E−01 | −1.7455E−01 |
| A8 = | −3.3176E−01 | 9.5882E−01 | 7.6638E−01 | −4.4200E−01 | −1.7624E−01 |
| A10 = | 4.4787E−01 | −1.9353E+00 | −1.7920E+00 | 1.3944E+00 | 2.0338E+00 |
| A12 = | −2.8213E−01 | 1.6029E+00 | 1.6355E+00 | −2.1522E+00 | −5.1396E+00 |
| A14 = | | −4.9741E−01 | −4.8958E−01 | 1.4226E+00 | 5.6150E+00 |
| A16 = | | | | | −2.2155E+00 |

| Surface # | 8 | 9 | 10 | 11 | 12 |
|---|---|---|---|---|---|
| k = | −4.4500E+01 | −8.1563E+00 | −1.7586E+01 | −2.0027E+00 | −3.5101E+00 |
| A4 = | −5.1951E−02 | 3.4752E−01 | 1.4923E−01 | −3.5022E−01 | −1.8096E−01 |
| A6 = | −2.7998E−01 | −6.3931E−01 | −1.2814E−01 | 2.2409E−01 | 1.1025E−01 |
| A8 = | 2.5620E−01 | 5.5864E−01 | −5.0471E−03 | −8.9495E−02 | −5.4675E−02 |
| A10 = | 1.6296E−01 | −3.7590E−01 | 3.5323E−02 | 2.3844E−02 | 1.7929E−02 |
| A12 = | −5.7714E−01 | 1.2854E−01 | −1.4695E−02 | −4.0004E−03 | −3.5380E−03 |
| A14 = | 4.9863E−01 | −5.0223E−03 | 2.6269E−03 | 3.7918E−04 | 3.7519E−04 |
| A16 = | −1.3028E−01 | −3.9862E−03 | −1.9072E−04 | −1.5448E−05 | −1.6212E−05 |

In the optical image capturing lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| f (mm) | 3.82 | f/f3 | 0.05 |
|---|---|---|---|
| Fno | 1.85 | |f/f3| + |f/f4| + |f/f5| | 0.32 |
| HFOV (deg.) | 37.0 | SAG42/CT4 | −0.87 |
| V2 + V3 + V4 | 69.9 | |SAG41a/SAG41b| | 0.13 |
| T12/T23 | 0.09 | TL (mm) | 4.46 |
| |R3/R4| | 20.63 | TL/ImgH | 1.52 |
| f1/f2 | −0.44 | | |

9th Embodiment

Figure 17:
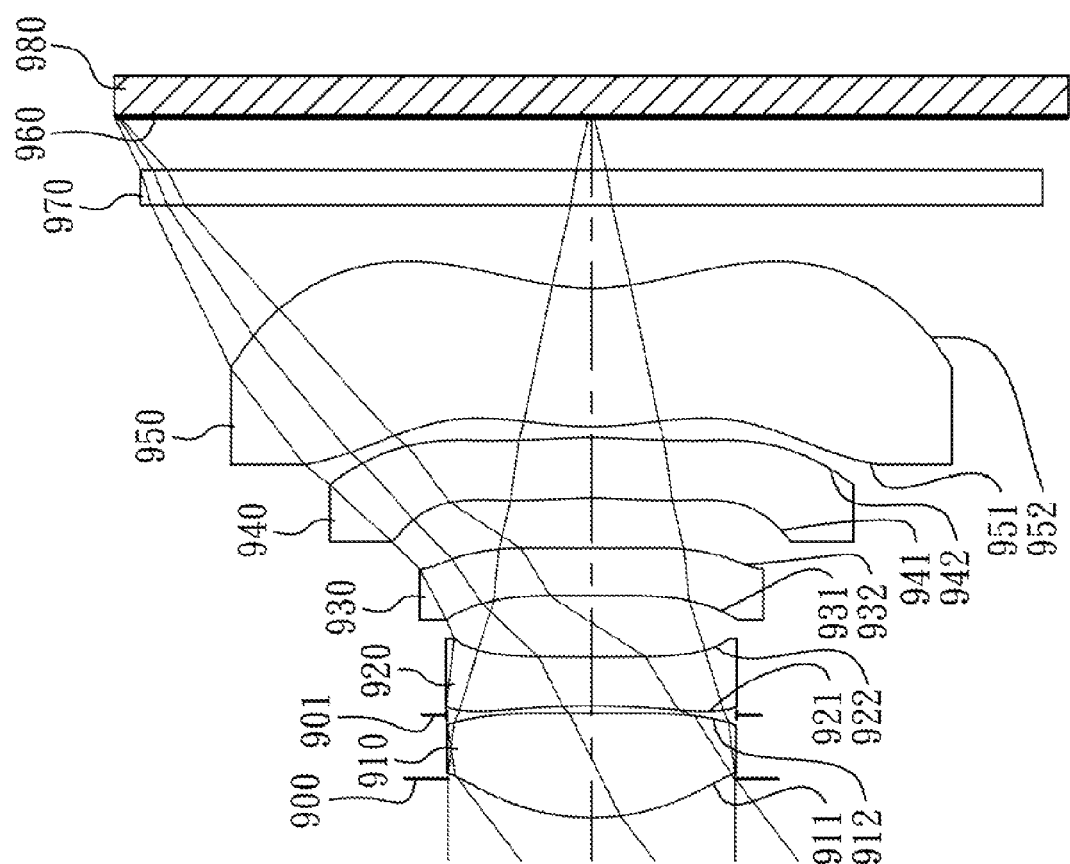
FIG. 17 is a schematic view of an optical image capturing lens assembly according to the 9th embodiment of the present disclosure.
Figure 18:
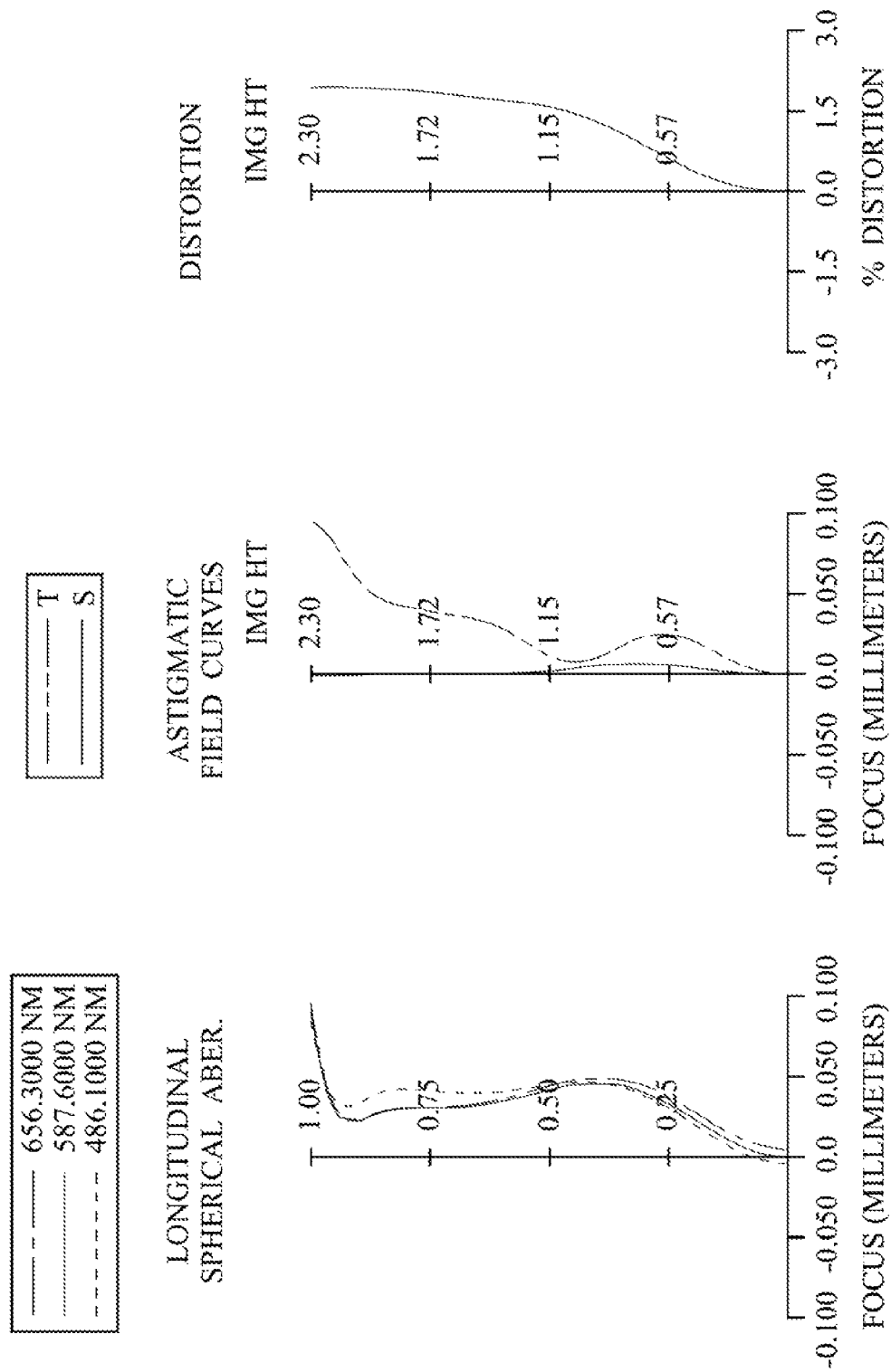
FIG. 18 shows spherical aberration curves, astigmatic field curves and a distortion curve of the optical image capturing lens assembly according to the 9th embodiment.

FIG. 17 is a schematic view of an optical image capturing lens assembly according to the 9th embodiment of the present disclosure. FIG. 18 shows spherical aberration curves, astigmatic field curves and a distortion curve of the optical image capturing lens assembly according to the 9th embodiment. In FIG. 17, the optical image capturing lens assembly includes, in order from an object side to an image side, an aperture stop 900, a first lens element 910, a stop 901, a second lens element 920, a third lens element 930, a fourth lens element 940, a fifth lens element 950, an IR-cut filter 970, an image plane 960 and an image sensor 980, wherein the optical image capturing lens assembly has a total of five lens elements (910-950) with refractive power.

The first lens element 910 with positive refractive power has a convex object-side surface 911 at a paraxial region and a convex image-side surface 912 at a paraxial region, and is made of plastic material. The object-side surface 911 and the image-side surface 912 of the first lens element 910 are aspheric.

The second lens element 920 with negative refractive power has a concave object-side surface 921 at a paraxial region and a concave image-side surface 922, at a paraxial region and is made of plastic material. The object-side surface 921 and the image-side surface 922 of the second lens element 920 are aspheric.

The third lens element 930 with negative refractive power has a convex object-side surface 931 at a paraxial region and a concave image-side surface 932 at a paraxial region, and is made of plastic material. The object-side surface 931 and the image-side surface 932 of the third lens element 930 are aspheric.

The fourth lens element 940 with negative refractive power has a concave object-side surface 941 at a paraxial region and a convex image-side surface 942 at a paraxial region, and is made of plastic material. The object-side surface 941 and the image-side surface 942 of the fourth lens element 940 are aspheric, wherein the object-side surface 941 of the fourth lens element 940 is concave at the paraxial region and includes two inflection points between the paraxial region and a peripheral region thereof.

The fifth lens element 950 with negative refractive power has a convex object-side surface 951 at a paraxial region and a concave image-side surface 952 at a paraxial region, and is made of plastic material. The object-side surface 951 and the image-side surface 952 of the fifth lens element 950 are aspheric, wherein both of the object-side surface 951 and the image-side surface 952 have at least one inflection point.

The IR-cut filter 970 is made of glass, and located between the fifth lens element 950 and the image plane 960, and will not affect the focal length of the optical image capturing lens assembly.

The detailed optical data of the 9th embodiment are shown in Table 17 and the aspheric surface data are shown in Table 18 below.

TABLE 17

Embodiment 9
f = 2.88 mm, Fno = 2.07, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.190 | | | | |
| 2 | Lens 1 | 1.070 | ASP | 0.506 | Plastic | 1.544 | 55.9 | 1.95 |
| 3 | | −81.776 | ASP | −0.010 | | | | |
| 4 | Stop | Plano | | 0.045 | | | | |
| 5 | Lens 2 | −3.763 | ASP | 0.240 | Plastic | 1.650 | 21.4 | −5.46 |
| 6 | | 62.671 | ASP | 0.295 | | | | |
| 7 | Lens 3 | 81.301 | ASP | 0.232 | Plastic | 1.640 | 23.3 | −37.99 |
| 8 | | 18.692 | ASP | 0.244 | | | | |
| 9 | Lens 4 | −2.153 | ASP | 0.291 | Plastic | 1.640 | 23.3 | −78.67 |
| 10 | | −2.368 | ASP | 0.057 | | | | |
| 11 | Lens 5 | 1.689 | ASP | 0.671 | Plastic | 1.535 | 56.3 | −9.26 |
| 12 | | 1.085 | ASP | 0.400 | | | | |
| 13 | IR-cut filter | Plano | | 0.175 | Glass | 1.517 | 64.2 | — |
| 14 | | Plano | | 0.258 | | | | |
| 15 | Image | Plano | | — | | | | |

Note:
Reference wavelength (d-line) is 587.6 nm.
Half of the diameter of the stop at Surface 4 is 0.702 mm.

TABLE 18

Aspheric Coefficients

| Surface # | 2 | 3 | 5 | 6 | 7 |
|---|---|---|---|---|---|
| k = | −1.8264E−02 | −9.0000E+01 | −4.1729E+01 | 9.0000E+01 | 2.0000E+01 |
| A4 = | −7.3747E−02 | −2.4656E−02 | 6.7567E−02 | 1.9440E−01 | −4.4000E−01 |
| A6 = | 3.8517E−01 | −2.4201E+00 | −1.2371E+00 | 5.1656E−01 | 4.0040E−01 |
| A8 = | −2.1896E+00 | 1.4487E+01 | 1.0745E+01 | −1.0906E+00 | −1.0754E+01 |
| A10 = | 4.9843E+00 | −4.4194E+01 | −3.5700E+01 | 5.2157E+00 | 7.5550E+01 |
| A12 = | −6.9761E+00 | 6.5540E+01 | 5.7831E+01 | −1.2240E+01 | −2.5021E+02 |
| A14 = | 2.1504E+00 | −3.8126E+01 | −3.5055E+01 | 1.4294E+01 | 4.0492E+02 |
| A16 = | | | | | −2.5636E+02 |

| Surface # | 8 | 9 | 10 | 11 | 12 |
|---|---|---|---|---|---|
| k = | 7.8833E−01 | −6.1166E+01 | −1.6991E+01 | −9.9931E+00 | −7.5780E+00 |
| A4 = | 9.2635E−02 | 1.0217E+00 | 9.1806E−01 | −4.0099E−01 | −2.0161E−01 |
| A6 = | −2.5454E+00 | −2.9936E+00 | −2.2025E+00 | 6.2492E−02 | 1.2159E−01 |
| A8 = | 5.4738E+00 | 3.3645E+00 | 2.5790E+00 | 1.1014E−01 | −8.4882E−02 |
| A10 = | −2.0366E+00 | −1.4636E+00 | −1.9109E+00 | 4.1023E−03 | 4.3136E−02 |
| A12 = | −1.3316E+01 | −1.2915E+00 | 8.9425E−01 | −5.5916E−02 | −1.3745E−02 |
| A14 = | 2.5139E+01 | 1.6549E+00 | −2.3490E−01 | 2.4181E−02 | 2.3006E−03 |
| A16 = | −1.3356E+01 | −4.4815E−01 | 2.5327E−02 | −3.1982E−03 | −1.4855E−04 |

In the optical image capturing lens assembly according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 2.88 | f/f3 | −0.08 |
| Fno | 2.07 | \|f/f3\| + \|f/f4\| + \|f/f5\| | 0.42 |
| HFOV (deg.) | 37.7 | SAG42/CT4 | −0.78 |
| V2 + V3 + V4 | 68.0 | \|SAG41a/SAG41b\| | 0.09 |
| T12/T23 | 0.12 | TL (mm) | 3.40 |
| \|R3/R4\| | 0.06 | TL/ImgH | 1.48 |
| f1/f2 | −0.36 | | |

It is to be noted that TABLES 1-18 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. An optical image capturing lens assembly comprising, in order from an object side to an image side:
    a first lens element with positive refractive power having a convex object-side surface;
    a second lens element;
    a third tens element;
    a fourth lens element having an object-side surface and an image-side surface being aspheric; and
    a fifth lens element having a convex object-side surface and a concave image-side surface, wherein the object-side surface and the image-side surface of the fifth lens element are aspheric, and the fifth lens element has at least one inflection paint formed on the image-side surface thereof;
    wherein the optical image capturing lens assembly has a total of five lens elements, an Abbe number of the second lens element is V2, an Abbe number of the third lens element is V3, an Abbe number of the fourth lens element is V4, a focal length of the optical image capturing lens assembly is a focal length of the third lens element is f3, and the following relationships are satisfied:

$30 < V2 + V3 + V4 < 90$, and $-0.60 < f/f3 < 0.20$.

2. The optical image capturing lens assembly of claim 1, wherein the first lens element has a concave image-side surface.

3. The optical image capturing lens assembly of claim 1, wherein the third lens element has a concave object-side surface.

4. The optical image capturing lens assembly of claim wherein a maximum image height of the optical image capturing lens assembly is ImgH, an axial distance between the object-side surface of the first lens element and an image plane is TL, and the following relationship is satisfied:

$TL/ImgH < 1.60$.

5. The optical image capturing lens assembly of claim 1, wherein the Abbe number of the second lens element is V2, the Abbe number of the third lens element is V3, the Abbe number of the fourth lens element is V4, and the following relationship is satisfied:

$50 < V2 + V3 + V4 < 80$.

6. The optical image capturing lens assembly of claim 1, wherein a distance in parallel with an optical axis from an axial vertex on the object-side surface of the fourth lens element to 70% of a maximum effective diameter position on the object-side surface of the fourth lens element is SAG41a, a distance in parallel with the optical axis from the axial vertex on the object-side u ace of the fourth lens element to the maximum effective diameter position on the object-side surface of the fourth lens element is SAG41b, and the following relationship is satisfied:

$|SAG41a/SAG41b| < 0.30$.

7. The optical image capturing lens assembly of claim 1, wherein the first lens element, the second lens element, the third lens element, the fourth lens element and the fifth lens element are made of plastic material, and there is an air gap between every two of the first lens element, the second lens element, the third lens element, the fourth lens element and the fifth lens element that are adjacent to each other.

8. The optical image capturing lens assembly of claim 1, wherein a curvature radius of the object-side surface of the fifth lens element is greater than a curvature radius of the image-side surface of the fifth lens element.

9. An optical image capturing lens assembly comprising, in order from an object side to an image side:
    a first lens element with positive refractive power having a convex object-side surface;
    a second lens element;
    a third lens element;
    a fourth lens element having an object-side surface and an image-side surface being aspheric; and
    a fifth lens element having a concave image-side surface, wherein an object-side surface the image-side surface of the fifth lens element are aspheric, and the fifth lens element has at least one inflection point formed on the image-side surface thereof;
    wherein the optical image capturing lens assembly has a total of five lens elements, an Abbe number of the second lens element is V2, an Abbe number of the third lens element is V3, an Abbe number of the fourth lens element is V4, a focal length of the optical image capturing lens assembly is f, a focal length of the third lens element is f3, a focal length of the fourth lens ent is f4, a focal length of the fifth lens element is f5, and the following relationships are satisfied:

$30 < V2 + V3 + V4 < 90$; and $|f/f3| + |f/f4| + |f/f5| < 0.9$.

10. The optical age capturing lens assembly of claim 9, wherein the fourth lens element has negative refractive power.

11. The optical image capturing lens assembly of claim 9, wherein the fifth lens element has negative refractive power.

12. The optical image capturing lens assembly of claim wherein the focal length of the optical image capturing lens assembly is f, the focal length of the third lens element is f3, the focal length of the fourth lens element is f4 the focal length of the fifth lens element is f5, and the following relationship is satisfied:

$|f/f3| + |f/f4| + |f/f5| < 0.5$.

13. The optical image capturing lens assembly of claim 9, wherein a focal length of the first lens element is f1, a focal length of the second lens element is f2, and the following relationship is satisfied:

$$-0.60 < f1/f2 < -0.15.$$

14. The optical image capturing lens assembly of claim 9, wherein the Abbe number of the second lens element is V2, the Abbe number of the third lens element is V3, the Abbe number of the fourth lens element is V4, and the following relationship is satisfied:

$$50 < V2+V3+V4 < 80.$$

15. The optical mage capturing lens assembly of claim 9, wherein a distance in parallel with an optical axis from an axial vertex on the object-side surface of the fourth lens element to 70% of a maximum effective diameter position on the object-side surface of the fourth lens element is SAG41a, a distance in parallel with the optical axis from the axial vertex on the object-side surface of the fourth lens element to the maximum effective diameter position on the object-side surface of the fourth lens element is SAG41b, and the following relationship is satisfied:

$$|SAG41a/SAG41b| < 0.30.$$

16. The optical image capturing lens assembly of claim 9, wherein a maximum image height of the optical image capturing lens assembly is ImgH, an axial distance between the object-side surface of the first lens element and an image plane is TL, and the following relationship is satisfied:

$$TL/ImgH < 1.60.$$

17. The optical image capturing lens assembly of claim 9, wherein an axial distance between the object-side surface of the first lens element and an image plane is TL, and the following relationship is satisfied:

$$2.0 \text{ mm} < TL < 4.8 \text{ mm}.$$

18. The optical image capturing lens assembly of claim 9, wherein a central thickness of the fifth lens element is the largest among central thicknesses of the first lens element, the second lend element, the third lens element, the fourth lens element and the fifth lens element.

19. An optical image capturing lens assembly comprising, in order from an object side to an image side:
   a fir lens e lenient with positive refractive power having a convex object-side surface;
   a second lens element;
   a third lens element,
   a fourth lens element having an object-side surface and n image-side surface being aspheric; and
   a fifth lens element having a concave image-side surface, wherein an object-side surface and the image-side surface of the fifth lens element are aspheric, and the fifth lens element has at least one inflection point formed on the image-side surface thereof;
   wherein the optical image capturing lens assembly has a total of five lens elements, a curvature radius of the object-side surface of the fifth lens element is greater than a curvature radius of the image-side surface of the fifth lens element, an Abbe number of the second lens element is V2, an Abbe number of the third lens element is V3, an Abbe number of the fourth lens element is V4, a maximum image height of the optical image capturing lens assembly is ImgH, an axial distance between the object-side surface of the first lens element and an image plane is TL, and the following relationships are satisfied:

$$30 < V2+V3+V4 < 90; \text{ and}$$

$$TL/ImgH < 1.60.$$

20. The optical image capturing lens assembly of claim 19, wherein the first lens element has a concave image-side surface.

21. The optical image capturing lens assembly of claim 19, wherein an axial distance between the first lens element and the second lens element is T12, an axial distance between the second lens element and the third lens element is T23, and the following relationship is satisfied:

$$0 < T12/T23 < 0.75.$$

22. The optical image capturing lens assembly of claim 19, wherein an axial distance between the third lens element and the fourth lens element is greater than an axis distance between the fourth lens element and the fifth lens element.

23. The optical image capturing lens assembly of claim 19, wherein an axial distance between the second lens element and the third lens element is the largest among an axial distance between the first lens element and the second lens element, the axial distance between the second lens element and the third lens element, an axial distance between the third lens element and the fourth lens element, and an axial distance between the fourth lens element and the fifth lens element.

24. An optical image capturing lens assembly comprising, in order from an object side to an image side:
   a first lens element with positive refractive power having a convex object-side surface;
   a second lens element having concave object-side surface;
   a third lens element;
   a fourth lens element having an object-side surface and en image-side surface being aspheric; and
   a fifth lens element having convex object-side d a concave image-side surface, wherein the object-side surface and t e a e-side surface of the fifth lens element are aspheric, and the fifth lens element has at least one inflection point formed on the image-side surface thereof;
   wherein the optical image capturing lens assembly has a total of five lens elements, an Abbe number of the second lens element is V2, an Abbe number of the third lens element s V3, an Abbe number of the fourth lens element is V4, and the following relationship is satisfied:

$$30 < V2+V3+V4 < 90.$$

25. The optical image capturing lens assembly of claim 24, wherein an axial distance between the first lens element and the second lens element is T12 an axial distance between the second lens element and the third lens element is T23, and the following relationship is satisfied:

$$0 < T12/T23 < 0.75.$$

26. The optical image capturing lens assembly of claim 24, wherein a curvature radius of the object-side surface of the second lens element is R3, a curvature radius of an image-side surface of the second lens element is R4, and the following relationship is satisfied:

$$|R3/R4| < 0.85.$$

27. An optical image capturing lens assembly comprising, in order from an object side to an image side:
   a first lens element with positive refractive power having a convex object-side surface and a concave image-side surface;

a second lens element;
a third lens element;
a fourth lens element having an object-side surface and an image-side surface being aspheric; and
a fifth lens element having a concave image-side surface, wherein an object-side surface and the image-side surface of the h lens element are aspheric, and the fifth lens element has at least one inflection point formed on the image-side surface thereof;
wherein the optical image capturing lens assembly has a total of five lens elements an axial distance between the third lens element and the fourth lens element is greater than an axial distance between the fourth lens element and the fifth lens element, an Abbe number of the second lens element is V2, an Abbe number of the third lens element is V3, an Abbe number of the fourth lens element is V4, and the following relationship is satisfied:

$30 < V2+V3+V4 < 90.$

28. The optical image capturing lens assembly of claim 27, wherein the object-side surface of the fifth lens element is convex.

29. The optical image capturing lens assembly of claim 27, wherein the Abbe number of the second lens element is V2, the Abbe number of the third lens element is V3, the Abbe number of the fourth lens element is V4, and the following relationship is satisfied:

$50 < V2+V3+V4 < 80.$

30. The optical image capturing lens assembly of claim 27, wherein the first lens element, the second lens element, the third lens element, the fourth lens element and the fifth lens element are made of plastic material, and there is an air gap between every two of the first lens element, the second lens element, the third lens element, the fourth lens element and the fifth lens element that are adjacent to each other.

* * * * *